United States Patent
Mixer

(10) Patent No.: US 10,051,059 B2
(45) Date of Patent: Aug. 14, 2018

(54) METHODS AND APPARATUS TO CONTROL COMMUNICATIONS OF ENDPOINTS IN AN INDUSTRIAL ENTERPRISE SYSTEM BASED ON INTEGRITY

(71) Applicant: Fisher-Rosemount Systems, Inc., Round Rock, TX (US)

(72) Inventor: Robert A. Mixer, Cedar Park, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 299 days.

(21) Appl. No.: 14/732,228

(22) Filed: Jun. 5, 2015

(65) Prior Publication Data

US 2016/0359866 A1 Dec. 8, 2016

(51) Int. Cl.
*H04L 29/06* (2006.01)
*H04L 29/08* (2006.01)

(52) U.S. Cl.
CPC .......... *H04L 67/12* (2013.01); *H04L 63/0876* (2013.01)

(58) Field of Classification Search
CPC ............................ H04L 67/12; H04L 63/0876
USPC .............................. 726/2, 3, 4, 7, 26, 27, 29
See application file for complete search history.

(56) References Cited

U.S. PATENT DOCUMENTS

| | | | |
|---|---|---|---|
| 4,959,860 A * | 9/1990 | Watters | G06F 21/79 713/189 |
| 6,412,092 B1 * | 6/2002 | Raghunath | G06F 11/1004 714/807 |
| 2009/0094689 A1 * | 4/2009 | Gargaro | G06F 21/36 726/7 |
| 2009/0150525 A1 * | 6/2009 | Edgett | H04L 63/08 709/220 |
| 2010/0199332 A1 * | 8/2010 | Bachmann | H04L 63/0428 726/4 |
| 2010/0262706 A1 | 10/2010 | Rodriguez et al. | |
| 2011/0314145 A1 * | 12/2011 | Raleigh | H04L 41/0893 709/224 |
| 2012/0151206 A1 * | 6/2012 | Paris | H04L 63/08 713/155 |

(Continued)

FOREIGN PATENT DOCUMENTS

EP 2779569 9/2014

OTHER PUBLICATIONS

Regenscheid et al., "BIOS Integrity Measurement Guidelines (Draft)",National Institute of Standards and Technologies, Dec. 2011, 47 pages.

(Continued)

*Primary Examiner* — Sarah Su
(74) *Attorney, Agent, or Firm* — Hanley, Flight & Zimmerman, LLC

(57) ABSTRACT

Methods and apparatus to control communications of endpoints in an industrial enterprise system based on integrity are disclosed. An example apparatus includes an integrity measurement comparator to compare an integrity measurement to a reference value. The integrity measurement is generated by an endpoint in a network of an industrial enterprise system based on a state of the endpoint. The reference value corresponds to a trusted state of the endpoint. The example apparatus also includes an authorization controller to enable communications access for the endpoint on the network based on the comparison of the integrity measurement to the reference value.

18 Claims, 19 Drawing Sheets

(56) References Cited

U.S. PATENT DOCUMENTS

| | | | |
|---|---|---|---|
| 2013/0150985 A1 | 6/2013 | Ohkado et al. | |
| 2014/0101771 A1 | 4/2014 | Tandon et al. | |
| 2015/0052616 A1* | 2/2015 | Hutchison | G06F 21/53 |
| | | | 726/27 |
| 2015/0278068 A1* | 10/2015 | Swanson | G06F 11/3476 |
| | | | 713/2 |

OTHER PUBLICATIONS

Andreas Steffen, "The Linux Integrity Measurement Architecture and TPM-Based Network Endpoint Assessment", ITA Institute for Internet Technologies and Applications HSR University of Applied Sciences Rapperswil, 2012, 12 pages.
Trusted Computer Group, "Open Standards for Integrity-based Network Access Control", 2005, 4 pages.
Steve Hanna, "Putting Trust Into the Network Securing Your Network Through Trusted Access Control", Trusted Network Connect Sub Group of Trusted Computing Group, Dec. 2006, 15 pages.
Lee Neitzel, "Six steps to control system cybersecurity", May/Jun. 2013, 3 pages.
Wikipedia, "Trusted Computing", available at: http://en.wikipedia.org/wiki/Trusted_Computing, last visited on Jun. 5, 2015, 15 pages.
Intellectual Property Office of the United Kingdom, "Search Report under Section 17(5)," issued in connection with Patent Application No. GB1609826.1, dated Nov. 29, 2016, 4 pages.

* cited by examiner

METHODS AND APPARATUS TO CONTROL COMMUNICATIONS OF ENDPOINTS IN AN INDUSTRIAL ENTERPRISE SYSTEM BASED ON INTEGRITY

FIELD OF THE DISCLOSURE

This disclosure relates generally to industrial control and, more particularly, to methods and apparatus to control communications of endpoints in an industrial enterprise system based on integrity.

BACKGROUND

Process control systems, like those used in chemical, petroleum or other industrial enterprises, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information and/or communicate the information to other controllers, workstations, or other components within the control system. Further, multiple control systems may be sub-systems to a higher-level enterprise system in which information from the separate sub-systems may be cross-communicated and/or overseen by a supervisory system.

SUMMARY

Methods and apparatus to control communications of endpoints in an industrial enterprise system based on integrity are disclosed. An example apparatus includes an integrity measurement comparator to compare an integrity measurement to a reference value. The integrity measurement is generated by an endpoint in a network of an industrial enterprise system based on a state of the endpoint. The reference value corresponds to a trusted state of the endpoint. The example apparatus also includes an authorization controller to enable communications access for the endpoint on the network based on the comparison of the integrity measurement to the reference value.

An example method includes receiving an integrity measurement from an endpoint in a network of an industrial enterprise system. The integrity measurement is generated by the endpoint based on a state of the endpoint. The example method further includes comparing the integrity measurement to a reference value corresponding to a trusted state of the endpoint. The example method also includes enabling communications access for the endpoint to the network based on the comparison.

An example article of manufacture includes instructions that, when executed, cause a machine to at least receive an integrity measurement from an endpoint in a network of an industrial enterprise system. The integrity measurement is generated by the endpoint based on a state of the endpoint. The instructions further cause the machine to compare the integrity measurement to a reference value corresponding to a trusted state of the endpoint. The instructions also cause the machine to enable communications access for the endpoint to the network based on the comparison.

DETAILED DESCRIPTION

Figure 1:
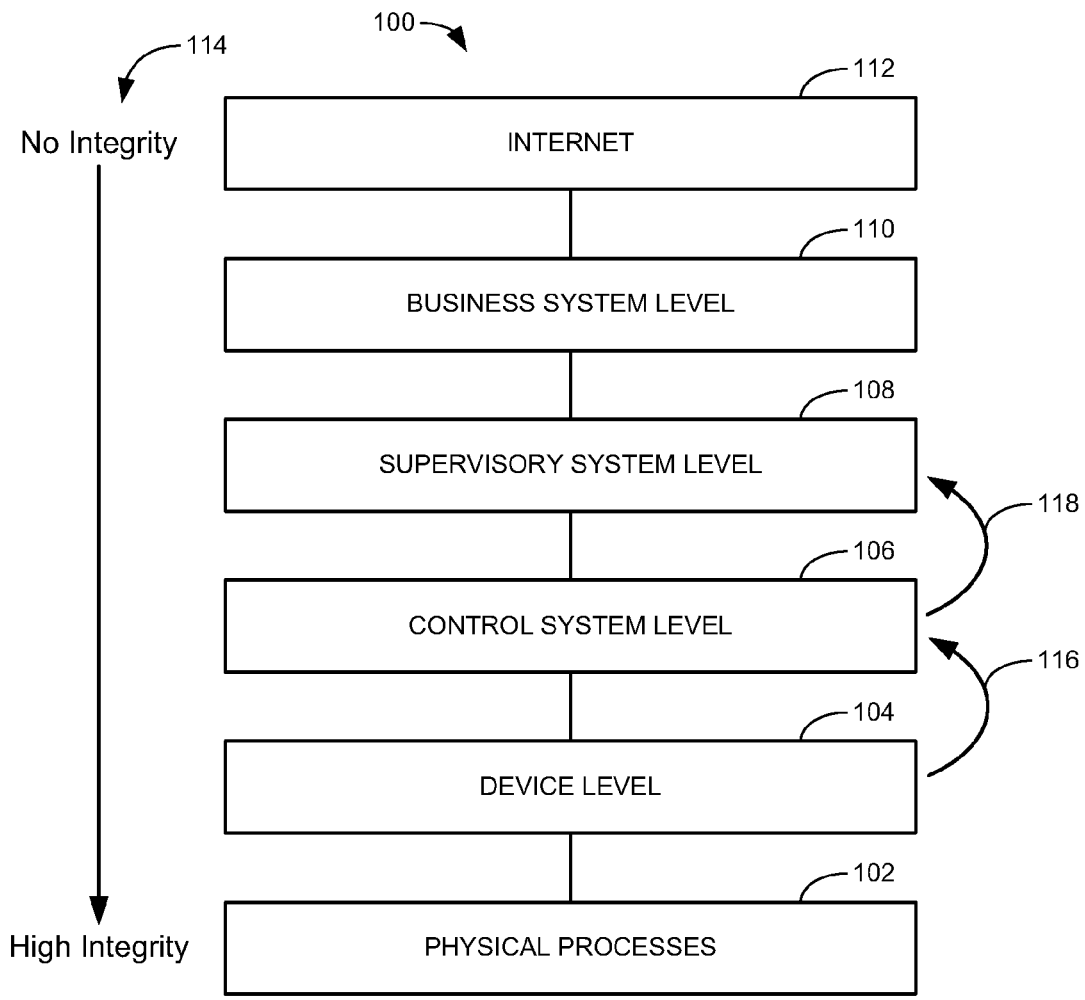
FIG. 1 is a block diagram of an example hierarchy of components in an industrial enterprise system.

As used herein, an industrial enterprise system refers to the raw materials and associated physical processes, field devices interacting with such processes, corresponding control systems that control such processes, and higher level administrative systems of an industrial enterprise. Thus, an industrial enterprise system is a system of hierarchically related systems (i.e., there are multiple levels) that are typically interconnected via corresponding networks. As used herein, an industrial system computing endpoint (or endpoint) refers to any computing component that serves as a node on a network (at any level) within an industrial enterprise system to communicate with other such components. Thus, as used herein, an endpoint includes individual computing devices (e.g. field devices, controllers, I/O devices, self-contained plugin cards for controllers and/or I/O devices, workstations, servers, etc.) as well as systems or groups of such devices that operate as an integrated whole subordinate to some higher level system (e.g., a modular control system within a larger control system, a control system within a supervisory system, etc.). Typically, endpoints in an industrial enterprise system establish communications with each other based either on their configuration information (for more capable endpoints) or their physical connectivity (for less capable endpoints). In the context of computer and data security, the establishment of communications between such endpoints is based on a form of implicit trust because no endpoint really knows whether communications from other endpoints are secure and reliable or have been compromised by some sort of security breach or other failure. More particularly, establishing communications between endpoints to operate an industrial enterprise depends on each endpoint trusting that the other endpoint is (a) legitimate (i.e., the other endpoint is what it says it is) and (b) running with full integrity (i.e., the other endpoint is functioning properly and that the communications sent, as well as the data generated for such communications, have not been compromised).

Some known industrial system endpoints base the trust in the security and/or reliabilities of communications on identifying information (e.g. serial numbers, hardware addresses, or IP addresses) associated with each endpoint and knowledge of the communications protocol used to communicate. While this serves to confirm the legitimacy of a particular endpoint (e.g., whether an endpoint is what it says it is), such approaches are insufficient to provide any reliable indication of the integrity of each endpoint (e.g., whether an endpoint is operating as expected or whether it has been compromised, thereby placing the reliability of its operation into question). In the past, trust based on integrity has largely been assumed based on the assurance of product quality by the manufacturers of the computing endpoints involved in the communications. That is, manufacturers typically follow standards (e.g., International Organization for Standardization (ISO) 9000) defining quality assurance processes for the development and testing of software, firmware, and/or hardware. As a result, there is some level of trust that the devices (e.g., endpoints) produced by such manufacturers will function as they are designed (i.e., with trustworthy integrity).

While quality assurances of manufacturers provide a certain level of trust in the integrity of the computing devices the manufacturers produce, such assurances hold less weight over time because of the possibility of a breach in security or other causes of failure after the device leaves control of the manufacturer. For example, there is the possibility that a computing device is tampered with between the time a device is shipped from a manufacturer and delivered to an end user. Furthermore, even after a computing device is received by an end user, there is the possibility of the device being hacked and altered with malicious code. While security measures are typically set in place to reduce and/or detect such attacks, if a particular attack is not recognized, the malicious software may impact the operation of the computing device. As a result, trust in the integrity of such a device and/or communications sent from the device may be misplaced. Accordingly, there is a need to verify the integrity of endpoints when they are newly acquired, configured, and put into operation as well as to monitor the integrity of endpoints in an industrial enterprise system over time to detect any potential threats to or defects in the integrity of such endpoints and implement suitable responses based on any corresponding change in the level of trust given to communications from such endpoints.

Examples disclosed herein overcome the above-identified problems by having endpoints on a network provide calculated or measured values indicative of certain aspects of their current state for comparison to known good values corresponding to the state of the endpoints in a trusted state (i.e., a state of integrity) before allowing the endpoints to communicate on the corresponding network. The measurements generated by an endpoint regarding its own state are herein referred to as integrity measurements. In some examples, integrity measurements are generated by calculating one or more checksums of various aspects of the endpoint that can provide an indication of the operation, security, and/or reliability of the endpoint. Thus, in some examples, the integrity measurements are described herein as being calculated. That is, data associated with various aspects of the endpoint is passed through a cryptographic checksum algorithm to produce a value that may be used as an integrity measurement or to build an integrity measurement (along with checksums calculated for other aspects of the endpoint). In some examples, integrity measurements are generated based on the software stack of the endpoint. In some examples, integrity measurements are generated based on the configuration of the endpoint within a control system. In some examples, integrity measurements are generated based on the peripherals associated with the endpoint. In some examples, the integrity measurements are generated by a standalone security chip associated with the endpoint. Further, in some examples, the integrity measurements are generated during boot-time of the endpoint. In other examples, the integrity measurements are generated during runtime of the endpoint. In some examples, where the endpoint corresponds to a sub-system of multiple computing devices (e.g., endpoints), the integrity measurements are combinations of multiple lower level integrity measurements associated with each individual device within the sub-system.

Each integrity measurement generated by an endpoint may be compared to corresponding reference values that are known to correspond to a trusted state for the endpoint. In some examples, the reference values are based on integrity measurements generated when an endpoint is first acquired, installed, and/or configured. In some examples, the reference values are defined based on values provided by the manufacturer of the endpoint. When a comparison of integrity measurements and the reference values indicates a match, the downstream endpoint is confirmed as being in a trusted state. That is, the software/firmware, hardware/peripherals, configuration, and/or other measured aspects of the endpoint are as expected such that communications from the endpoint can be trusted and/or relied upon. In such situations, the endpoint may be admitted to a corresponding network with full communications based on its verified integrity. However, if the integrity measurements fail to match the corresponding reference values, the integrity of the endpoint becomes suspect and an appropriate response may be implemented. In some such examples, the type and/or degree of communications access of the endpoint may be limited and defined as something less than full communications access. In some examples, the degree or type of communications access provided to an endpoint is established based on authorization information provided by the upstream endpoint that is used to generate or define secret and/or public values or keys used to complete communications between endpoints. Such integrity-based verification process may be implemented for new endpoints being added to a network (to ensure the endpoint is legitimate and operating as expected before it is registered and/or configured on the network) and/or can be applied to endpoints already in operation (to verify whether a previously configured endpoint has been compromised in some manner to place its integrity into question).

FIG. 1 is a block diagram of an example hierarchy 100 of levels 102, 104, 106, 108, 110, 112 of a typical industrial enterprise system. The example hierarchy of FIG. 1 follows the Purdue Reference model outlined in ISA 95 (International Society of Automation 95). At the lowest level, the hierarchy 100 begins with the physical processes 102 of a manufacturing/processing enterprise. For example, the physical processes 102 in an industrial enterprise system correspond to the materials and/or products being processed as well as the pipes, tanks, heaters, conveyors, and/or other equipment assets that directly interact with the materials and/or products being processed. The next level up in the hierarchy is the device level 104. The device level 104 corresponds to smart and/or non-smart field devices that sense, monitor, and/or manipulate the physical process. For example, the device level 104 includes valves, actuators, temperature sensors, pressure sensors, and so forth.

Further, the device level 104 may include controllers and/or I/O devices that interact with and/or control the field devices. Such controllers and I/O devices serve as an interface between the device level 104 and the control system level 106 immediately above in the hierarchy 100. The control system level 106 is to directly supervise and control the field devices, thereby controlling the physical processes. A control system at the control system level 106 may be a distributed control system (DCS), a supervisory and data acquisition (SCADA) system, and/or other process control system. Typically, the control system level 106 includes one or more controllers and/or I/O devices directly connected with field devices associated with the device level 104. Further, the control system level 106 typically includes one or more servers and/or workstations providing a human machine interface (HMI) with which operators may configure, monitor, and/or adjust the control of the physical processes. Each of the controllers, I/O devices, workstations, and/or servers in a particular control system may be connected via a network of the control system, referred to herein as the control network of the control system.

The supervisory system level 108 is the next level up in the hierarchy 100 and is representative of the operations that oversee the manufacturing/processing of the enterprise. Thus, the supervisory system level 108 typically includes a system of sub-systems (e.g., corresponding to one or more control systems associated with the control system level 106) and one or more workstations and/or servers to interact with the sub-systems. Such a system is referred to herein as a supervisory system. In some examples, a supervisory system may oversee the manufacturing/processing operations of a particular plant within an enterprise. Each of the workstations, servers, and other sub-systems (e.g., different control systems associated with the control system level 106) may be connected via a network for the supervisory system, referred to herein as a plant network or supervisory network of the supervisory system.

Above the supervisory system level 108 is the business system level 110 that corresponds to the business-related activities and decisions that direct and oversee all aspects of the enterprise. The highest level in the hierarchy 100 of the illustrated example corresponds to the Internet 112. Although the Internet is not technically a level within a particular enterprise, enterprises are often implemented based upon communications accomplished via the Internet. As such, the Internet 112 is represented for purposes of explanation in a discussion of computer security and integrity as it relates to industrial enterprise systems.

Extending along the length of the example hierarchy 100 of FIG. 1 is an integrity scale 114 representing the importance of integrity or trustworthiness of computer endpoints at each level in the hierarchy 100 to accomplish the intended purpose of the enterprise. As shown in the illustrated example, higher degrees of integrity are needed at hierarchical levels closer to the physical process while integrity becomes less critical the further away from the physical process a computing device is implemented. For example, if the operations of the very bottom level in an enterprise (corresponding to the physical processes 102) cannot be trusted to operate as expected, then there can be no trust in the resulting products being processed and/or manufactured, which is the main purpose of establishing the enterprise in the first place. However, the physical equipment assets and materials being processed as part of the physical processes 102 typically correspond to pipes, tanks, hoppers, and the like, as well as the associated raw materials. Thus, while the correct operation of the physical processes 102 is crucial to an industrial enterprise system, from the view point of computer and data integrity, the most important level is the device level 104. The device level 104 is most important (i.e., the integrity of the corresponding devices (e.g., field devices, controllers, I/O devices, etc.) are the most critical) because it corresponds to the computing devices or endpoints that are closest to and directly interact with the physical processes 102.

The next most critical level in the hierarchy 100 for purposes of integrity is the control system level 106 because a control system defines the configuration and implementation of the controllers, I/O devices, and field devices at the device level 104. Decisions made at the supervisory system level 108 typically do not directly impact the physical processes such that this level is less critical in terms of integrity. The degree of integrity needed at each successive level moving away from the physical processes 102 continues to decrease until reaching the Internet where integrity is not important or at least cannot be expected because the Internet 112 is an open network to which virtually anyone can connect and over which anyone can communicate. To ensure and maintain the integrity of endpoints implemented in lower levels in the hierarchy 100 while still enabling communications between the levels, limitations are placed on the communications between endpoints at the lower levels in the hierarchy 100 and endpoints at higher levels. More particularly, the nature or type of communications access as well as the extent of communications (e.g., the number and types of other endpoints to which a first endpoint communicates) may be strictly controlled to reduce the chances of a particular endpoint becoming corrupted (e.g., losing integrity because of a security breach). Likewise, communications are limited and specifically controlled to reduce the possibility of a potentially corrupted endpoint in a system from affecting other endpoints.

In addition to controlling communications between endpoints to protect endpoints and reduce the likelihood of endpoints becoming corrupted, as described more fully below, in some examples, the integrity or trustworthiness of endpoints are tested at various points in time to specifically identify any endpoints that may have been compromised to proactively respond by limiting and/or entirely denying communications from such endpoints. Briefly, in some examples, the endpoints within a given level in the example hierarchy 100 request registration and/or admission to a network one level up in the hierarchy 100. To be admitted such that full communications access is enabled and/or allowed, in some examples, a measurement provided by each endpoint indicative of its current state needs to match a reference value corresponding to the endpoint when in a known trusted state (e.g., a state of integrity). If a measurement fails to match the corresponding reference value, communication admittance may be entirely denied or the endpoint may be placed in a remedial mode in which the nature and/or scope of communications are significantly restricted (e.g., limited to software/firmware updates). In some examples disclosed herein, integrity based measurements are implemented before authorizing communications between endpoints at different levels in the hierarchy 100. More particularly, endpoints of lower hierarchy levels are tested for integrity before communications are enabled with higher hierarchy levels. For example, as represented by the arrow 116 of FIG. 1, a field device or a corresponding controller and/or I/O device at the device level 104 may need to provide an integrity measurement of its current state that matches a corresponding reference value before the field device or corresponding controller and/or I/O device can communicate on a control network of a control system at the control system level 106. Likewise, as represented by the arrow 118 of FIG. 1, a control system at the control system level 106 may need to provide an integrity measurement of its current state that matches a corresponding reference value before the control system can communicate on a supervisory network of a supervisory system at the supervisory system level 108. This verification process of a lower level endpoint (where integrity is critical) by a higher level component (where the integrity is less important) serves to ensure that the endpoints closest to the physical processes 102 are operating as expected (i.e., with integrity).

Figure 2:
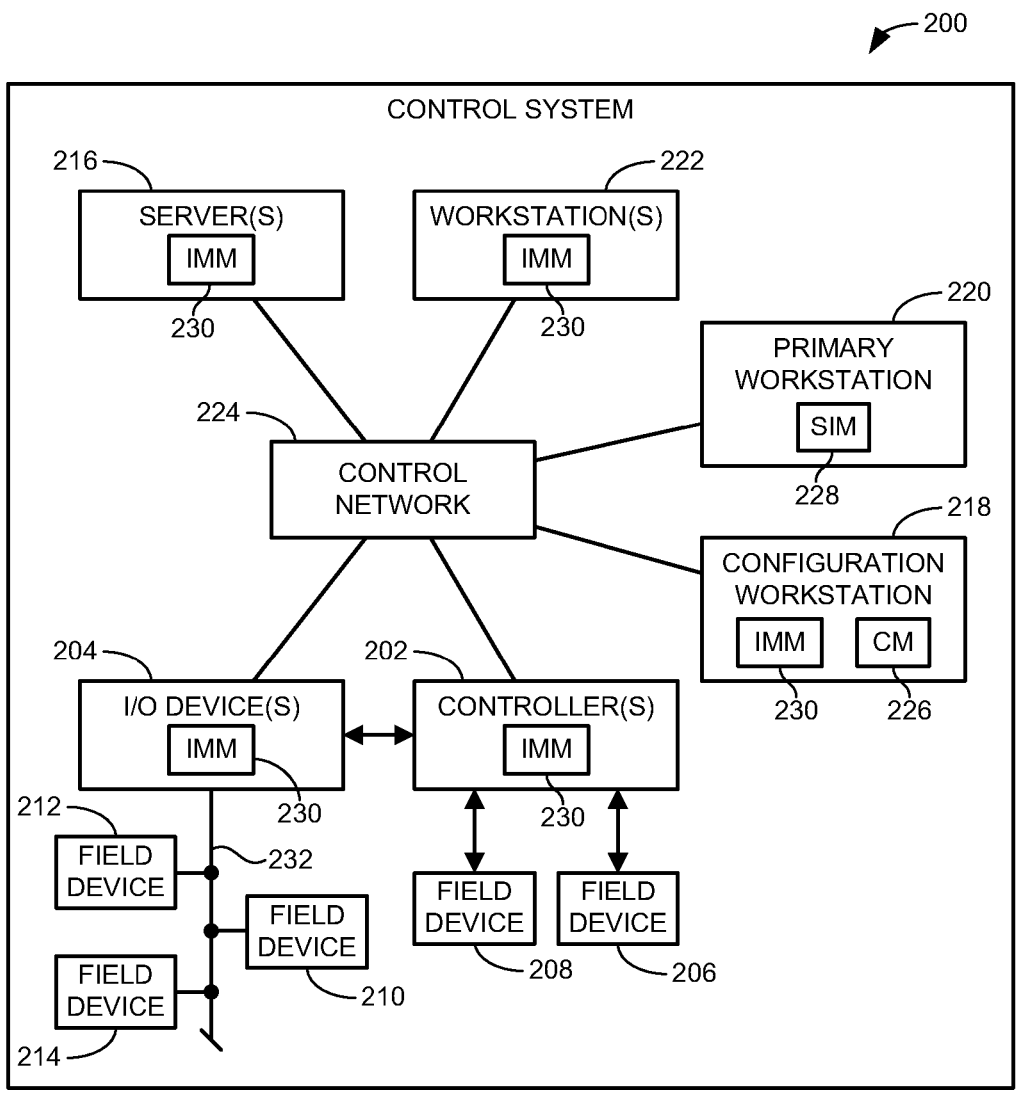
FIG. 2 is a block diagram of an example control system corresponding to the control system level of the example hierarchy of FIG. 1.

FIG. 2 is a schematic illustration of an example control system 200 corresponding to the control system level 106 in the hierarchy 100 of FIG. 1. The example control system 200 of FIG. 2 includes one or more process controller(s) 202 and one or more I/O device(s) 204 that interface with field devices 206, 208, 210, 212, 214 corresponding to the device level 104 of the hierarchy 100 of FIG. 1. Additionally, the example control system 200 of FIG. 2 includes one or more server(s) 216 and one or more operator stations, application stations, and/or other workstations (collectively referred to herein as workstations). In the illustrated example, one workstation within the control system 200 is designated or serves as a configuration workstation 218 while another workstation serves as a primary workstation 220 (other workstation(s) are represented at reference numeral 222). In the illustrated example, the example controller(s) 202, the example I/O device(s) 204, the example server(s) 216, and the example workstations 218, 220, 222 are communicatively coupled via a communication bus and/or local area network 224, generally referred to herein as a control network of the control system 200.

The example configuration workstation 218 includes a configuration module (CM) 226 to generate a configuration file based on configuration data provided by an engineer, operator, and/or other personnel that defines all the parameters and logic desired in the implementation of the devices (e.g., endpoints) within the control system 200. Once the configuration file has been generated, the configuration workstation 218 transmits the configuration file to each of the endpoints of the control network 224 in the control system 200, whereby each endpoint may be configured.

The example primary workstation 220 includes a system integrity monitor (SIM) 228 to oversee, authorize, and/or control the communications access of each endpoint on the control network 224 of the control system 200. That is, as described more fully below, the SIM 228 of the example primary workstation 220 of FIG. 2 confirms and/or verifies the integrity of the other endpoints within the control system 200 to either allow communications access or limit such access. More particularly, in some examples, the SIM 228 receives one or more integrity measurements from each endpoint generated by an integrity measurement module (IMM) 230 associated with each endpoint. As the integrity measurements are received at the SIM 228, the SIM 228 compares the integrity measurements to a database of reference values. If the measurements match reference values, the corresponding endpoint is admitted into full communication with other endpoints over the control network 224. On the other hand, if the integrity measurements do not match the reference values, the SIM 228 may implement remedial actions to limit or deny access to the control network 224 for communications. In some examples, the SIM 228 of the primary workstation 220 monitors the integrity of the other endpoints on the control network 224 to detect any changes and to respond accordingly. Although the primary workstation 220 and the configuration workstation 218 are represented as separate workstations, in some examples, a single workstation may serve both functions (e.g., implement both the CM 226 and the SIM 228).

The example control network 224 of FIG. 2 may be implemented using any desired communication medium and protocol. For example, the example control network 224 may be based on a hardwired and/or wireless Ethernet communication scheme. However, any other suitable communication medium(s) and/or protocol(s) could be used.

The example I/O device(s) 204 of FIG. 2 are coupled to a plurality of smart field devices 210, 212 214 via a digital data bus 232. The smart field devices 210, 212, 214 may be Fieldbus compliant valves, actuators, sensors, etc., in which case the smart field devices 210, 212, 214 communicate via the digital data bus 232 using the well-known Foundation Fieldbus protocol. Of course, other types of smart field devices and communication protocols could be used instead. For example, the smart field devices 210, 212, 214 could instead be Profibus and/or HART compliant devices that communicate via the data bus 232 using the well-known Profibus and HART communication protocols. In addition to the example smart field devices 210, 212, 214, one or more non-smart field devices 206, 208 may be communicatively coupled to the example controller 202. The example non-smart field devices 206, 208 of FIG. 2 may be, for example, conventional 4-20 milliamp (mA) or 0-10 volts direct current (VDC) devices that communicate with the controller 202 via respective hardwired links. Typically, the field devices 206, 208, 210, 212, 214 are designed with relatively limited processing power specific to implement their designated functions. Accordingly, a field device may not implement an IMM 230 that generates an integrity measurement indicative of a current state of the field device. However, in some examples, one or more of the field devices 206, 208, 210, 212, 214 may implement an IMM 230 in the same manner as the other devices noted above. In some such examples, the corresponding controller 202 or I/O device 204 may implement a separate SIM that governs the communications between the field devices 206, 208, 210, 212, 214 and the respective controller 202 or I/O device 204. In other such examples, the SIM 228 implemented by the primary workstation 220 may control the communications access of such field devices.

While FIG. 2 illustrates an example control system 200 within which the methods and apparatus to control communication admissions based on integrity measurements described in greater detail below may be advantageously employed, persons of ordinary skill in the art will readily appreciate that the teachings disclosed herein may, if desired, be advantageously employed in other control systems of greater or less complexity (e.g., having more than one controller, across more than one geographic location, etc.) than the illustrated example of FIG. 2.

Figure 3:
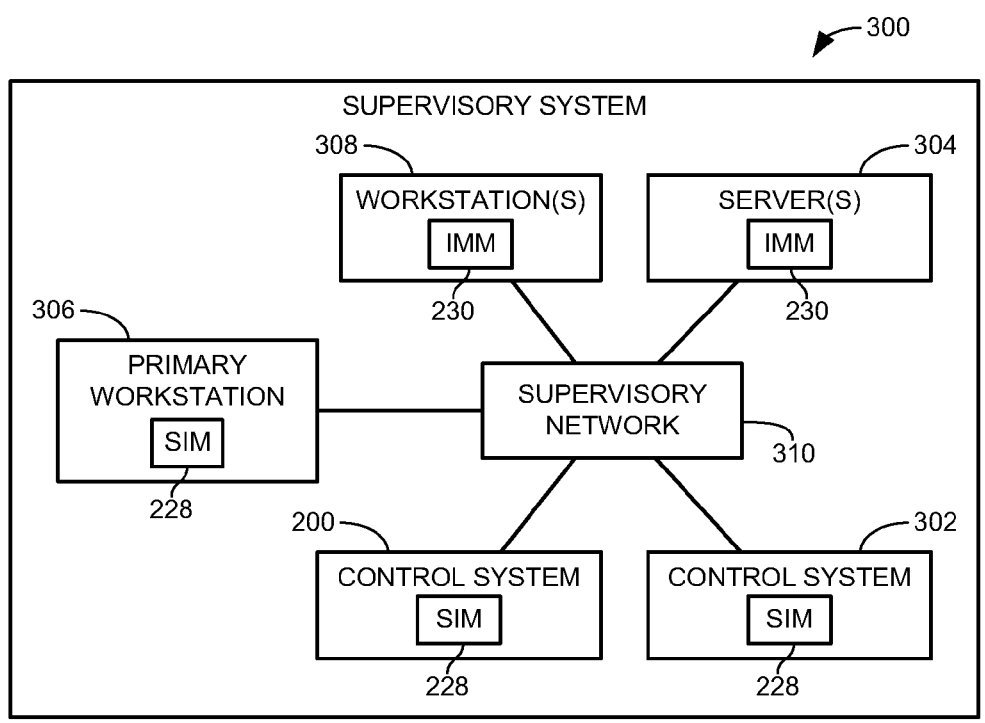
FIG. 3 is a block diagram of the example supervisory system corresponding to the supervisory system level of the example hierarchy of FIG. 1.

FIG. 3 is a schematic illustration of an example supervisory system 300 corresponding to the supervisory system level 108 in the hierarchy 100 of FIG. 1. The example supervisory system 300 of FIG. 3 includes the control system 200 of FIG. 2 and another control system 302 corresponding to the control system level 106 of the hierarchy 100 of FIG. 1. Additionally, the example supervisory system 300 of FIG. 3 includes one or more server(s) 304 and one or more workstations 306, 308. In the illustrated example, the control systems 200, 302, the server(s) 304, and the workstations 306, 308 are communicatively coupled via a communication bus and/or local area network 310, generally referred to herein as a supervisory network for the supervisory system 300.

In the illustrated example, one of the workstations 306 operates as a primary workstation to oversee and/or control the communications access of the other endpoints (e.g., the individual server(s) 304 and workstation(s) 308, or the control systems 200, 302 as sub-systems of the supervisory system 300) connected to the supervisory network 310 in the same or similar manner as the primary workstation 220 in the control system 200 of FIG. 2. That is, in the illustrated example, the primary workstation 306 is provided with a SIM 228 to receive integrity measurements indicative of the current state of the other endpoints and compare the measurements to reference values. In the illustrated example, the integrity measurements associated with the server(s) 304 and/or the workstation(s) 308 are generated via corresponding IMMs in each of the server(s) 304 and workstation(s) 308. Although each control system 200, 302 may be treated as an endpoint (from the perspective of the supervisory system 300), because the control systems 200, 302 are representative of a sub-system of multiple devices, no single IMM can generate the integrity measurements to be analyzed by the SIM 228 of the primary workstation 306. Accordingly, in some examples, the SIM 228 of the primary workstation 306 within each control system (e.g., the primary workstation 220 of the control system 200 of FIG. 2) generates one or more integrity measurements indicative of a state of the entire sub-system to be provided to the SIM 228 of the primary workstation 306 of the supervisory system 300. In some examples, the integrity measurements for an entire control system (as an endpoint in a supervisory network) are based on a combination of the integrity measurements obtained from each of the IMMs 230 implemented on each endpoint of the control network of the control system.

While FIG. 3 illustrates an example supervisory system 300 within which the teachings disclosed herein may be advantageously employed, persons of ordinary skill in the art will readily appreciate that the teachings disclosed herein may, if desired, be advantageously employed in other systems of greater or less complexity (e.g., having more control systems, across more than one geographic location, etc.) than the illustrated example of FIG. 3.

Figure 4:
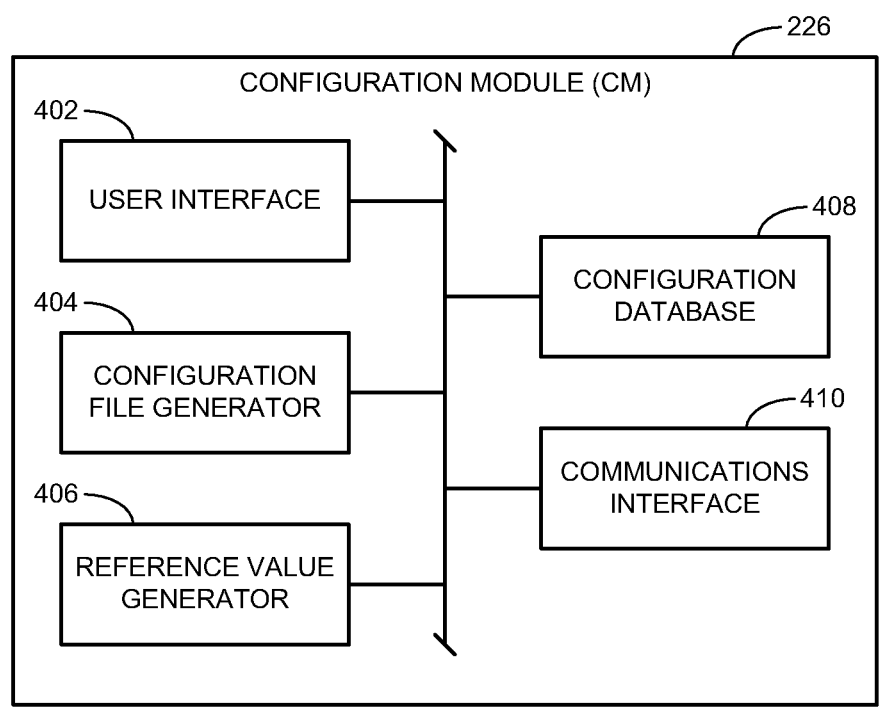
FIG. 4 illustrates an example manner of implementing the example configuration module of FIG. 2.

FIG. 4 illustrates an example manner of implementing the example configuration module (CM) 226 of FIG. 2. In the illustrated example, the CM 226 includes an example user interface 402, an example configuration file generator 404, an example reference value generator 406, an example configuration database 408, and an example communications interface 410.

The example CM 226 of FIG. 4 is provided with the example user interface 402 to enable interactions between the CM 226 and a configuration engineer and/or other user. More particularly, via the user interface 402, a system engineer may assign parameters, define control logic, specify IP addresses, designate names for physical cards, and/or provide any other relevant configuration data needed to configure each endpoint within the control system 200. The example configuration file generator 404 of the illustrated example takes the entered configuration data and generates a configuration file for the project or control system to which the configuration data is to be applied. In some examples, the configuration data and the resulting configuration file are stored in the example configuration database 408.

In the illustrated example of FIG. 4, the CM 226 is provided with the example reference value generator 406 to calculate configuration reference values for each endpoint in the control system 200 that is to be monitored for integrity (e.g., an integrity measurement module (IMM)) based on the configuration file. That is, based on the illustrated example of FIG. 2, the example configuration reference value generator 406 of the CM 226 generates reference values for each of the controller(s) 202, the I/O devices(s) 204, the server(s) 216, and the workstation(s) 218, 220, 222. In some examples, reference values are generated or calculated as a cryptographic checksum of the configuration data associated with the particular endpoint of interest. In such examples, the calculated values of the checksums correspond to the proper configuration of each endpoint because the checksums are calculated based on the original configuration file (developed by a system engineer). As such, these checksums values (integrity measurements) can be used as a baseline or reference to compare the actual configuration of the endpoints at a later point in time. Thus, when a particular endpoint generates integrity measurements (calculates checksums) of its own configuration at a later point in time, the generated integrity measurements should match the reference values. If the later generated integrity measurements do not match the corresponding reference values, there is the possibility that something is wrong with the endpoint that has compromised its integrity because its state of configuration is not as expected or originally defined. Additionally or alternatively, the reference value generator 406 may calculate reference rules corresponding to the state of hardware (peripherals) associated with each endpoint based on the configuration data.

In the illustrated example of FIG. 4, the CM 226 is provided with the example communications interface 402 to enable communications between the CM 226 and the other endpoints in the control system 200. In some examples, the configuration file, once generated, is transmitted to each endpoint via the communication interface 410 to enable each device to be configured in accordance with the designs of the system engineer. Further, in some examples, the communication interface 410 is used to provide the generated reference values to the system integrity monitor (SIM) 228 of the primary workstation 220 to compare against the integrity measurements of endpoints obtained at a later point in time.

While an example manner of implementing the CM 226 of FIG. 2 is illustrated in FIG. 4, one or more of the elements, processes and/or devices illustrated in FIG. 4 may be combined, divided, re-arranged, omitted, eliminated and/or implemented in any other way. Further, the example user interface 402, the example configuration file generator 404, the example reference value generator 406, the example configuration database 408, the example communications interface 410, and/or, more generally, the example CM 226 of FIG. 4 may be implemented by hardware, software, firmware and/or any combination of hardware, software and/or firmware. Thus, for example, any of the example user interface 402, the example configuration file generator 404, the example reference value generator 406, the example configuration database 408, the example communications interface 410, and/or, more generally, the example CM 226 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 402, the example configuration file generator 404, the example reference value generator 406, the example configuration database 408, and/or the example communications interface 410 is/are hereby expressly defined to include a tangible computer readable storage device or storage disk such as a memory, a digital versatile disk (DVD), a compact disk (CD), a Blu-ray disk, etc. storing the software and/or firmware. Further still, the example CM 226 of FIG. 2 may include one or more elements, processes and/or devices in addition to, or instead of, those illustrated in FIG. 4, and/or may include more than one of any or all of the illustrated elements, processes and devices.

Figure 5:
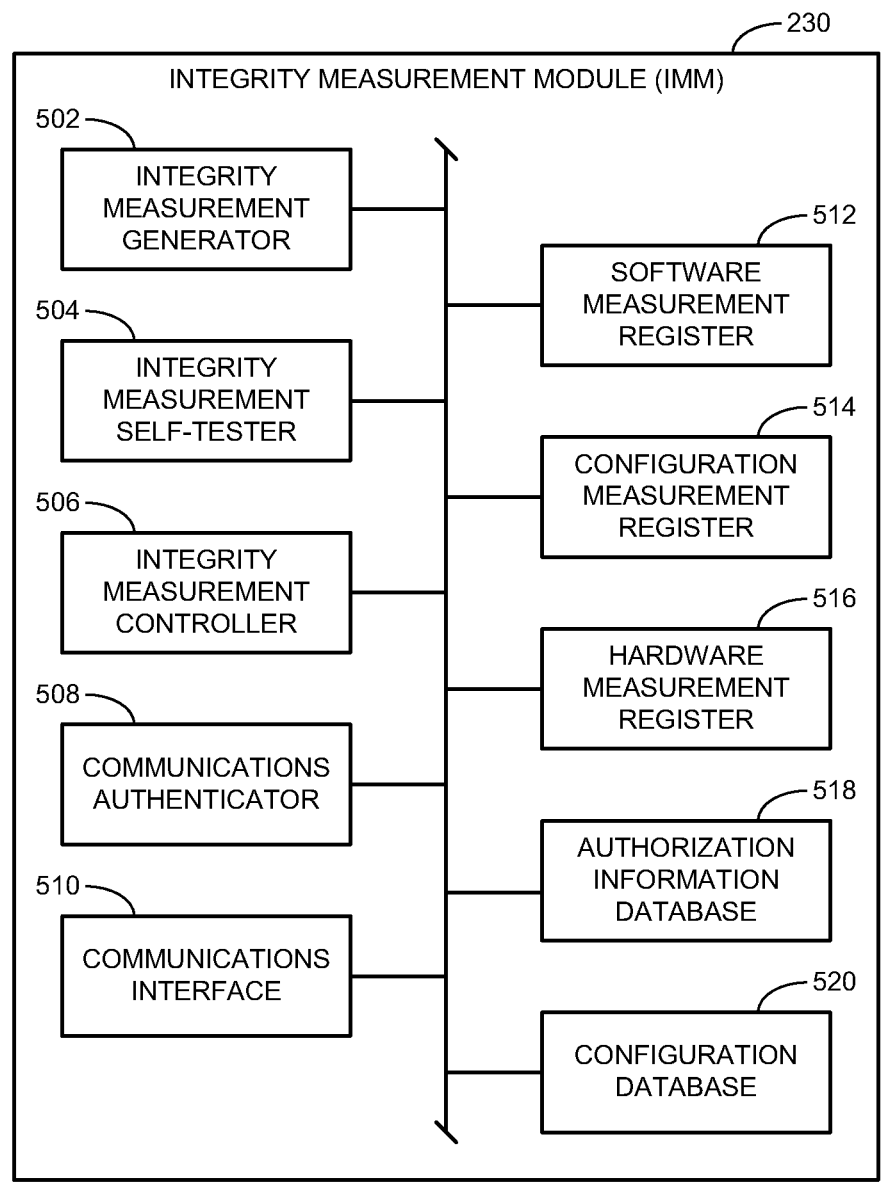
FIG. 5 illustrates an example manner of implementing the example integrity measurement modules of FIGS. 2 and/or 3.

FIG. 5 illustrates an example manner of implementing an example integrity measurement module (IMM) 230 of FIGS. 2 and/or 3. In the illustrated example, the IMM 230 includes an example integrity measurement generator 502, an example integrity measurement self-tester 504, an example integrity measurement controller 506, an example communications authenticator 508, an example communications interface 510, an example software measurement register 512, an example configuration measurement register 514, an example hardware measurement register 516, an example authorization information database 518, and an example configuration database 520.

In the illustrated example of FIG. 5, the IMM 230 is provided with the example integrity measurement generator 502 to calculate or generate integrity measurements associated with the particular endpoint implementing the IMM 230. In some examples, the integrity measurements correspond to the software and/or firmware of the endpoint implementing the IMM 230, herein referred to as software integrity measurements. In some examples, software integrity measurements are generated during boot-time when the software stack of the corresponding endpoint is being loaded. In some such examples, as each piece of software is loaded, a cryptographic checksum for the software is calculated by the integrity measurement generator 502 and added to the example software measurement register 512 (e.g., appended to previously calculated checksum values). In some examples, once all software is loaded (or before all the software is loaded) the resulting string of calculated checksums may be passed through a hashing algorithm to make the software integrity measurement more manageable (e.g., use less memory). In some examples, the IMM 230 is implemented as a hardware device (e.g., a Trusted Platform Module) to be independent of the rest of the software implemented by the endpoint. Alternatively, in some examples, where a separate security device is unavailable (e.g., in a pre-existing device), the IMM 230 may be implemented as software loaded onto the corresponding endpoint.

In some examples, the integrity measurements may alternatively or additionally correspond to the configuration of the endpoint implementing the IMM 230, herein referred to as configuration integrity measurements. As described above, a system engineer or other personnel may create a configuration file at the configuration workstation 218 that is then provided to each endpoint in the control system 200. In some examples, the portion of the configuration file for the system that is pertinent to each particular endpoint is used to configure that endpoint. In some examples, once the endpoint is configured, the parameters, logic, and/or other configuration data to which the endpoint has been configured are stored in the example configuration database 520 of the IMM 230. Thus, in some examples, a configuration integrity measurement is generated by calculating a cryptographic checksum of each part of the configuration data in the configuration database 520 assigned to the corresponding endpoint. As the checksum for each part of configuration data is calculated by the integrity measurement generator 502, the checksum is appended to the previously calculated checksums in the corresponding configuration measurement register 514. In some examples, a single checksum is calculated for the entire configuration file assigned to the endpoint. In other examples, multiple checksums are calculated for different portions of the configuration data and then combined (e.g., appended to each other in a string). In some examples, separate configuration files may apply to separate layers in the software stack and/or the endpoint may otherwise store multiple configuration files (e.g., different versions). In such examples, a separate checksum is calculated for the configuration data associated with each configuration file and then the resulting values are appended to each other. In some examples, once a checksum has been calculated for all configuration data (or before all configuration data have been analyzed) the resulting string of calculated checksums may be passed through a hashing algorithm to make the configuration integrity measurement more manageable.

In some examples, the integrity measurements may alternatively or additionally correspond to the hardware associated with the endpoint implementing the IMM 230, herein referred to as hardware integrity measurements. In some examples, the hardware associated with an endpoint corresponds to peripherals plugged into or otherwise coupled to the endpoint (e.g., I/O cards plugged into a controller). In some examples, a hardware integrity measurement is generated by calculating a cryptographic checksum for each peripheral associated with the endpoint. In some examples, the peripherals for which measurements (e.g., checksums) are to be generated are identified based on the configuration data stored in the configuration database 520. In some such examples, the integrity measurements are generated based on the configuration file associated with the peripheral. In other examples, the peripheral provides a checksum value indicative of its state in response to a request from the endpoint. As the checksum for each peripheral is generated by the integrity measurement generator 502, each checksum is appended to the previously calculated checksums in the corresponding hardware measurement register 516. In some examples, once checksums have been calculated for all (or any portion of the) hardware associated with an endpoint, the resulting string of calculated checksums may be passed through a hashing algorithm to make the hardware integrity measurement more manageable.

In the illustrated example of FIG. 5, the IMM 230 is provided with the example integrity measurement self-tester 504 to conduct preliminary tests on the functionalities utilized in generating integrity measurements. That is, in some examples the integrity measurement self-tester 504 performs an internal test of the ability of the integrity measurement generator 502 to properly calculate the values corresponding to the integrity measurements. For example, the integrity measurement self-tester 504 may verify that hash algorithms and checksum algorithms implemented by the integrity measurement generator 502 produce expected outputs based on known inputs.

In the illustrated example of FIG. 5, the IMM 230 is provided with the example integrity measurement controller 506 to control various operations of the IMM 230. In some examples, the integrity measurement controller 506 communicates instructions or commands to other portions of the example IMM 230 to control the operations of those portions. For example, the integrity measurement controller 506 directs when integrity measurements are to be generated by the integrity measurement generator 502 and the values are added to the respective registers 512, 514, 516; when the integrity measurements are to be reported via the communications interface 510; when the registers 512, 514, 516 are to be cleared of stored integrity measurements; and so forth.

In the illustrated example of FIG. 5, the IMM 230 is provided with the example communications authenticator 508 to authenticate and/or verify communications with other endpoints after it is given full communications access to the corresponding control network. In some examples, full communications access is enabled by the SIM 228 providing authorization information that is used by the endpoint to generate secret and/or public values for digital signatures, encryption/decryption, authentication, and so forth.

In some examples, the authorization information used by the communications authenticator 508 is provided to the IMM 230 to enable full communications access after the integrity of the endpoint has been confirmed or verified. For example, part of the initial configuration and commissioning of an endpoint upon receiving a new configuration file involves the endpoint rebooting. During the reboot, in some examples, the integrity measurement generator 502 generates software integrity measurements as described above. In some examples, configuration and/or hardware integrity measurements may also be generated. These integrity measurements are indicative of the current state of the endpoint (i.e., at the time of the reboot). After having been configured in accordance with the configuration file, the newly commissioned endpoint may request registration and admission to the control system. Before being admitted to communicate over the control network, the integrity measurements are compared to reference values. If the integrity measurements match the reference values, the endpoint is provided full communications access by being provided the authorization information from which secret and/or associated public values are generated. In some examples, corresponding authorization information is provided to other endpoints in the corresponding network so that each endpoint can communicate with the newly admitted endpoint (as well as each other).

There is the possibility that a particular endpoint is compromised in some manner after the initial configuration and after receiving the authorization information that provides full communications access to the endpoint. Accordingly, in some examples, the integrities of endpoints are monitored over time or verified at different points in time to detect any changes in the state of the endpoints indicative of having lost integrity (e.g., no longer being in a trusted state). In some examples, once a compromised endpoint has been detected, new authorization information is distributed to all other endpoints for use in future communications. In this manner, the compromised endpoint is denied full communications access going forward because the previously received authorization information is no longer valid. Further, in some such examples, unique authorization information is provided to the compromised endpoint to place the endpoint into a remedial mode and/or to enable communications access of a limited nature.

In some examples, the concern of an endpoint with suspect integrity using previously provided authorization information is resolved by the communications authenticator 508 encrypting the authorization information when initially received in a manner that can only subsequently be decrypted and used when the endpoint is in the same state as when the authorization information was first received. As such, if an endpoint has become compromised in some manner affecting its current state (as indicated by a change in the integrity measurements), the endpoint will no longer be able to access (decrypt) the authorization information necessary to communicate with other endpoints. As a result, in some examples, communications from an endpoint that has become compromised can be prevented without the SIM 228 having to detect the loss of integrity of the endpoint Some messages sent by an endpoint include reports of the integrity measurements for the endpoint. A challenge in network security is that of the lying endpoint. For example, inasmuch as the integrity of an endpoint is verified by comparing the integrity measurements to reference values corresponding to a known trusted state, there is the possibility that an infected endpoint merely repeats previously determined integrity measurements that match the reference values rather than providing integrity measurements generated from the actual and/or current state of the endpoint (which may indicate the endpoint is infected). To resolve this issue, in some examples, the IMM 230 is provided with a nonce (a unique value for a one time use) each time the integrity measurements are requested. In some such examples, the communications authenticator 508 combines the nonce with the integrity measurement when responding to the request such that an endpoint merely reporting pre-existing values for the integrity measurement (without the nonce) can be detected.

While an example manner of implementing the IMM 230 of FIGS. 2 and/or 3 is illustrated in FIG. 5, one or more of the elements, processes and/or devices illustrated in FIG. 5 may be combined, divided, re-arranged, omitted, eliminated and/or implemented in any other way. Further, the example integrity measurement generator 502, the example integrity measurement self-tester 504, the example integrity measurement controller 506, the example communications authenticator 508, the example communications interface 510, the example software measurement register 512, the example configuration measurement register 514, the example hardware measurement register 516, the example authorization information database 518, the example configuration database 520, and/or, more generally, the example IMM 230 of FIG. 5 may be implemented by hardware, software, firmware and/or any combination of hardware, software and/or firmware. Thus, for example, any of the example integrity measurement generator 502, the example integrity measurement self-tester 504, the example integrity measurement controller 506, the example communications authenticator 508, the example communications interface 510, the example software measurement register 512, the example configuration measurement register 514, the example hardware measurement register 516, the example authorization information database 518, the example configuration database 520, and/or, more generally, the example IMM 230 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example integrity measurement generator 502, the example integrity measurement self-tester 504, the example integrity measurement controller 506, the example communications authenticator 508, the example communications interface 510, the example software measurement register 512, the example configuration measurement register 514, the example hardware measurement register 516, the example authorization information database 518, and/or the example configuration database 520 is/are hereby expressly defined to include a tangible computer readable storage device or storage disk such as a memory, a digital versatile disk (DVD), a compact disk (CD), a Blu-ray disk, etc. storing the software and/or firmware. Further still, the example IMM 230 of FIGS. 2 and/or 3 may include one or more elements, processes and/or devices in addition to, or instead of, those illustrated in FIG. 5, and/or may include more than one of any or all of the illustrated elements, processes and devices.

Figure 6:
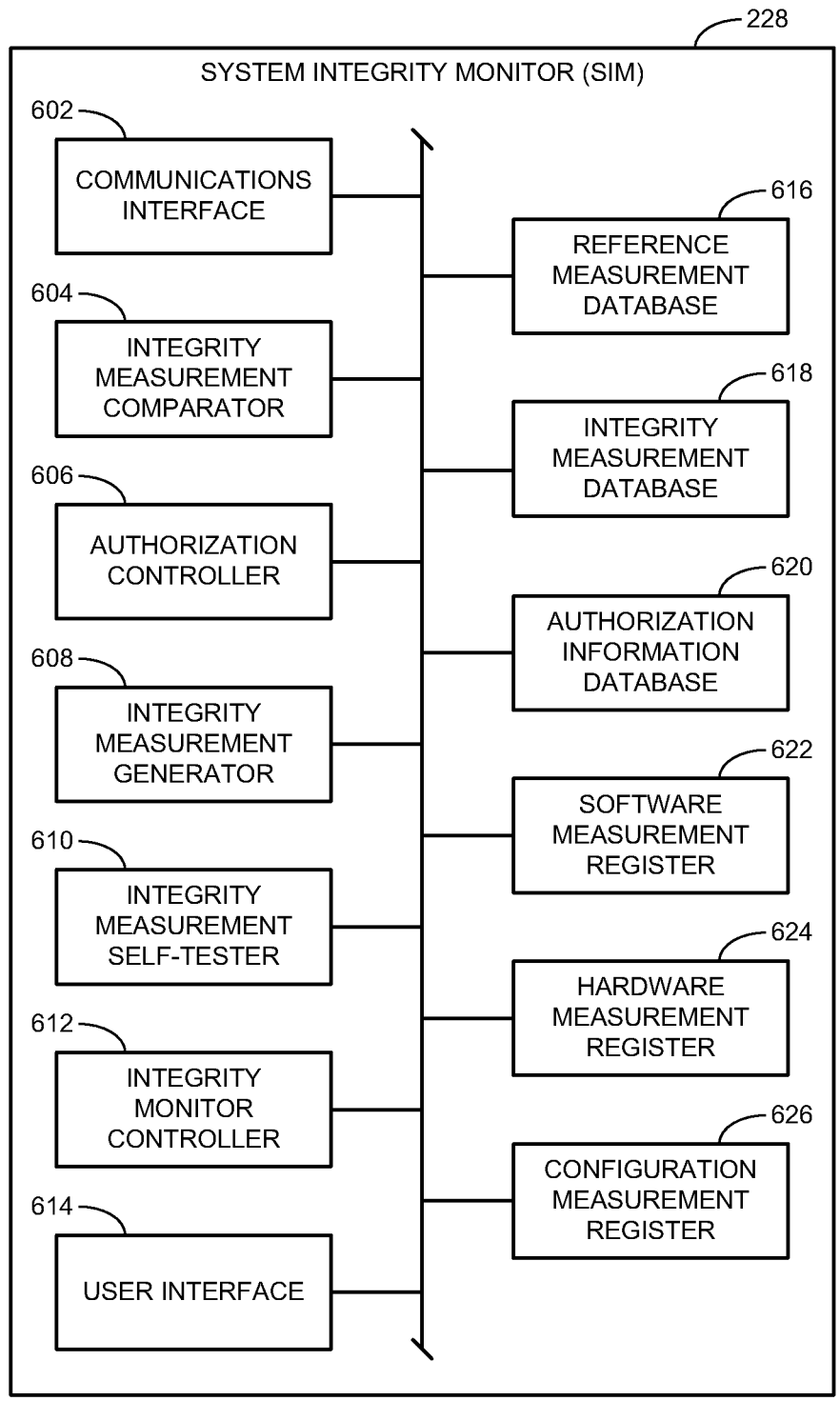
FIG. 6 illustrates an example manner of implementing the example system integrity monitors of FIGS. 2 and/or 3.

FIG. 6 illustrates an example manner of implementing the example system integrity monitors (SIM) 228 of FIGS. 2 and/or 3. In the illustrated example, the SIM 228 includes an example communications interface 602, an example integrity measurement comparator 604, an example authorization controller 606, an example integrity measurement generator 608, an example integrity measurement self-tester 610, an example integrity monitor controller 612, an example user interface 614, an example reference value database 616, an example integrity measurement database 618, an example authorization information database 620, an example software measurement register 622, an example hardware measurement register 624, and an example configuration measurement register 626.

In the illustrated example of FIG. 6, the SIM 228 is provided with the example communications interface 602 to communicate with other endpoints in the corresponding network. For example, the communications interface 602 of the SIM 228 sends out requests for integrity measurements from other endpoints. Similarly, the example communications interface 602 receives reports of integrity measurements from the IMMs 230 of the other endpoints and/or from the SIM 228 of a primary workstation of a sub-system (e.g., the control system 200 as an endpoint in the supervisory system 300). As such, in some examples, the SIM 228 of a primary workstation of a control system may communicate integrity measurements to a SIM 228 of a primary workstation of a supervisory system.

The example SIM 228 of FIG. 6 is provided with the example integrity measurement comparator 604 to compare integrity measurements to reference values stored in the example reference value database 616. In some examples, the reference values are received and/or generated based on the configuration file created with the configuration module 226 of the configuration workstation 218. In some examples, the reference values are received from a user manually entering the values via the example user interface 614 based on values provided by an original equipment manufacturer of the corresponding endpoint (e.g., included in documentation shipped with the device and/or provided online). In this way, the values are trustworthy as of the time of manufacture such that any tampering with devices during shipment can be detected. Additionally or alternatively, in some examples, some or all of the reference values are based on integrity measurements generated by the IMMs 230 of the respective endpoints when the endpoints are initially configured, commissioned, and/or added to the corresponding network. In some such examples, an engineer and/or other user approves the use of such integrity measurements as reference values. In this manner, the engineer is given an opportunity to verify that each particular endpoint is configured correctly and functioning as expected as these values will be what is used in testing the integrity of the endpoint at later points in time.

In the illustrated example of FIG. 6, the SIM 228 is provided with the example authorization controller 606 to establish the appropriate communication authorization or access for each endpoint based on the results of comparing the reported integrity measurements to the stored reference values. In some examples, if the integrity measurements match the reference values, the authorization controller 606 provides authorization information to the endpoint and all other authorized endpoints to enable communications therebetween. In some examples, the authorization information distributed to the other endpoints is also stored in the example authorization information database 620 of the SIM 228 for subsequent reference.

In some examples, if the integrity measurements do not match the corresponding reference values, the authorization controller 606 takes remedial action. In some examples, the remedial action includes denying communications access to the endpoint (e.g., by providing new authorization information to the other endpoints). In other examples, the communications access to the endpoint is not entirely denied but limited in certain ways. For example, the endpoint may be provided with unique authorization information that limits the endpoint to firmware update communications access (e.g., the only communications able to be performed are associated with updating the firmware of the endpoint). In some examples, the endpoint may be provided with unique authorization information that limits the endpoint to configuration communications access (e.g., the only communications able to be performed are associated with updating the configuration of the endpoint). In some examples, communications from the endpoint may be permitted but such communications are flagged. In some examples, the authorization controller 606 initiates an alarm and/or alert to inform a user of a potential loss of integrity. In some examples, along with preventing communications from a corrupted endpoint, the authorization controller 606 provides authorization information to a redundant or failover endpoint to take over the role of the corrupted endpoint. In some examples, the authorization controller 606 may implement any combination of the above remedial actions.

Additionally, in some examples, the authorization controller 606 generates nonce values to be provided along with requests for integrity measurements to be used by the corresponding IMM 230 in responding so that the responses from endpoints can be verified as legitimate.

In the illustrated example of FIG. 6, the SIM 228 is provided with the example integrity measurement generator 608 to generate integrity measurements indicative of the state of integrity of the entire system of endpoints the SIM 228 is monitoring. In some examples, such system-wide integrity measurements are generated by combining the integrity measurements collected from each endpoint in the associated network that the SIM 228 is monitoring. This combined integrity measurement may be reported to another SIM 228 at a workstation associated with a higher level in the hierarchy 100 of FIG. 1. In some examples, the integrity measurement generator 608 generates the combined integrity measurements by appending each integrity measurement reported from each endpoint in the network into the corresponding software, hardware, and configuration registers 622, 624, 626 and then calculating a checksum for the resulting strings of values. In some examples, the SIM 228 requests the integrity measurements from each endpoint before generating the combined integrity measurements. Additionally or alternatively, the combined integrity measurements may be generated based on previously reported integrity measurements stored in the integrity measurement database 618.

In the illustrated example of FIG. 6, the SIM 228 is provided with the example integrity measurement self-tester 610 to conduct preliminary tests on the functionalities utilized in generating integrity measurements. That is, in some examples, the integrity measurement self-tester 610 performs an internal test of the ability of the integrity measurement generator 608 to properly calculate values (e.g., checksums) corresponding to the integrity measurements. For example, the integrity measurement self-tester 610 may verify that hash algorithms and checksum algorithms implemented by the integrity measurement generator 608 produce expected outputs based on known inputs.

In the illustrated example of FIG. 6, the SIM 228 is provided with the example integrity monitor controller 612 to control various operations of the SIM 228. In some examples, the integrity monitor controller 612 communicates instructions or commands to other portions of the example SIM 228 to control the operations of those portions. For example, the integrity monitor controller 612 may maintain a schedule of when integrity measurements are to be requested from IMMs 230 of other endpoints. In some examples, the integrity monitor controller 612 controls and/or defines the order in which the different integrity measurements from the different endpoints are combined to generate combined integrity measurements because the order impacts the resulting checksum value of the entire string.

While an example manner of implementing the SIM 228 of FIGS. 2 and/or 3 is illustrated in FIG. 6, one or more of the elements, processes and/or devices illustrated in FIG. 6 may be combined, divided, re-arranged, omitted, eliminated and/or implemented in any other way. Further, the example communications interface 602, the example integrity measurement comparator 604, the example authorization controller 606, the example integrity measurement generator 608, the example integrity measurement self-tester 610, the example integrity monitor controller 612, the example user interface 614, the example reference value database 616, the example integrity measurement database 618, the example authorization information database 620, the example software measurement register 622, the example hardware measurement register 624, the example configuration measurement register 626, and/or, more generally, the example SIM 228 of FIG. 6 may be implemented by hardware, software, firmware and/or any combination of hardware, software and/or firmware. Thus, for example, any of the example communications interface 602, the example integrity measurement comparator 604, the example authorization controller 606, the example integrity measurement generator 608, the example integrity measurement self-tester 610, the example integrity monitor controller 612, the example user interface 614, the example reference value database 616, the example integrity measurement database 618, the example authorization information database 620, the example software measurement register 622, the example hardware measurement register 624, the example configuration measurement register 626, and/or, more generally, the example SIM 228 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 602, the example integrity measurement comparator 604, the example authorization controller 606, the example integrity measurement generator 608, the example integrity measurement self-tester 610, the example integrity monitor controller 612, the example user interface 614, the example reference value database 616, the example integrity measurement database 618, the example authorization information database 620, the example software measurement register 622, the example hardware measurement register 624, and/or the example configuration measurement register 626 is/are hereby expressly defined to include a tangible computer readable storage device or storage disk such as a memory, a digital versatile disk (DVD), a compact disk (CD), a Blu-ray disk, etc. storing the software and/or firmware. Further still, the example SIM 228 of FIGS. 2 and/or 3 may include one or more elements, processes and/or devices in addition to, or instead of, those illustrated in FIG. 6, and/or may include more than one of any or all of the illustrated elements, processes and devices.

Figure 7:
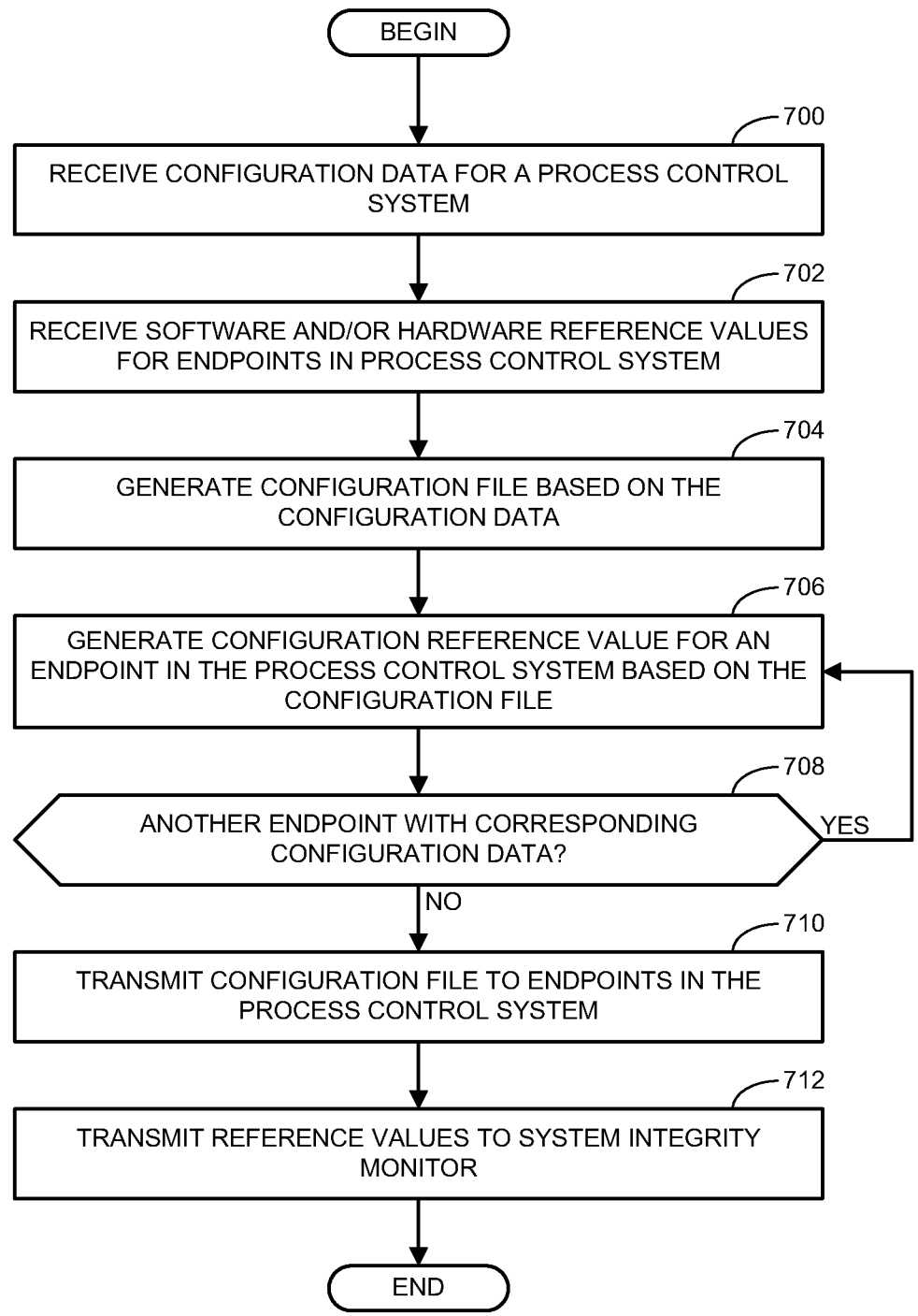
FIG. 7 is a flowchart representative of an example method that may be carried out to implement the example configuration module of FIGS. 2 and/or 4.
Figure 8:
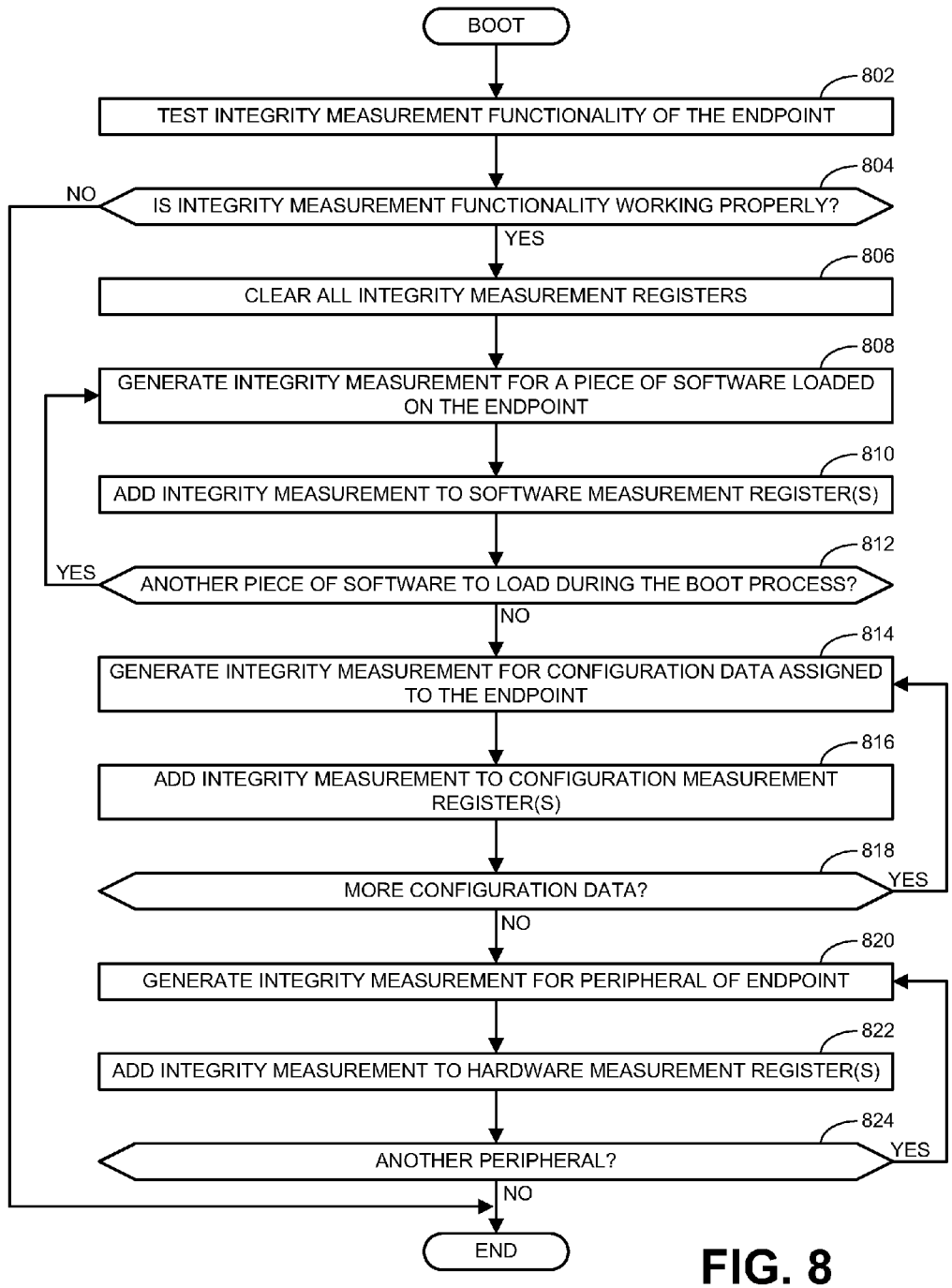
FIG. 8-10 are flowcharts representative of example methods that may be carried out to implement the example integrity measurement modules of FIGS. 2, 3, and/or 5.
Figure 9:
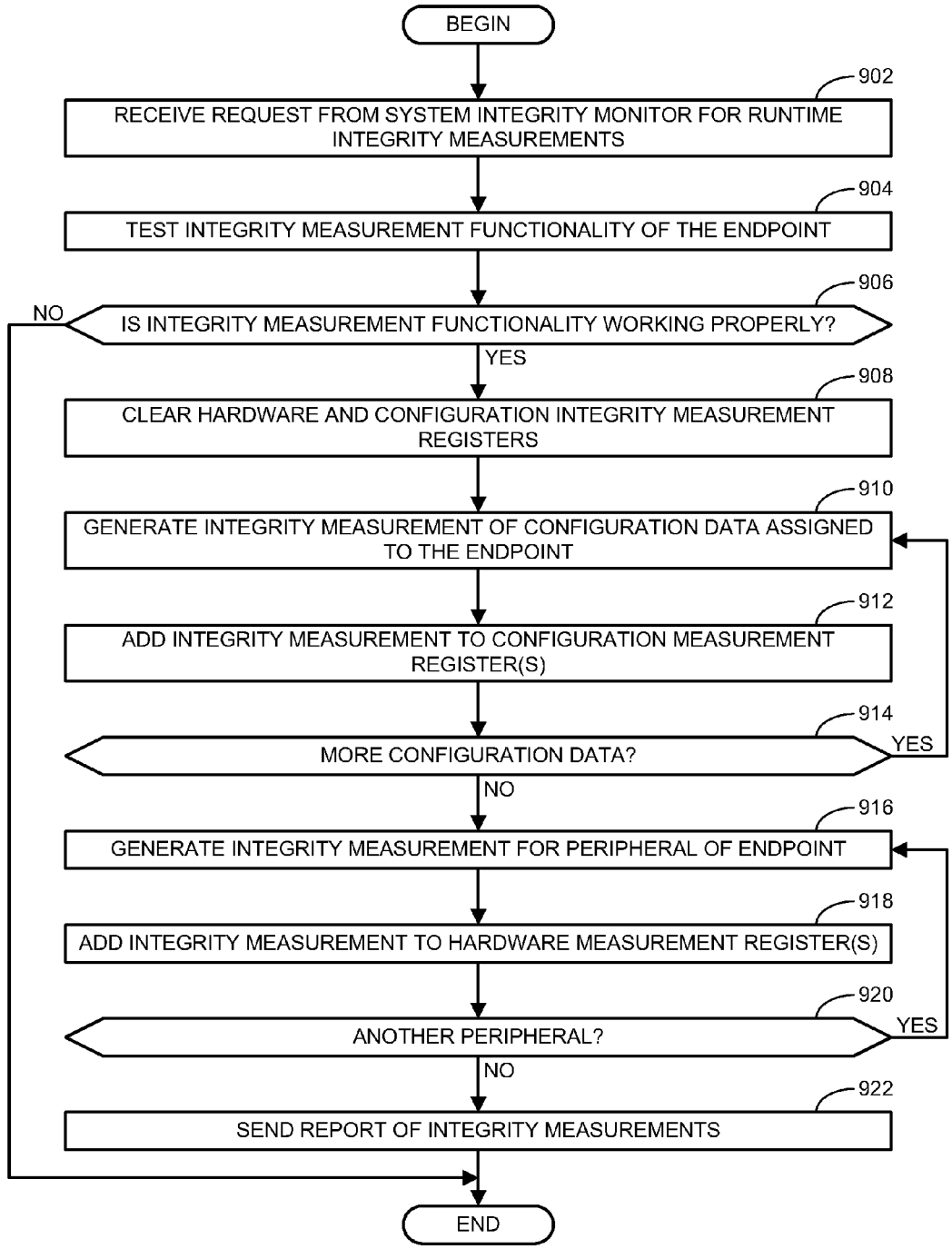
Figure 10:
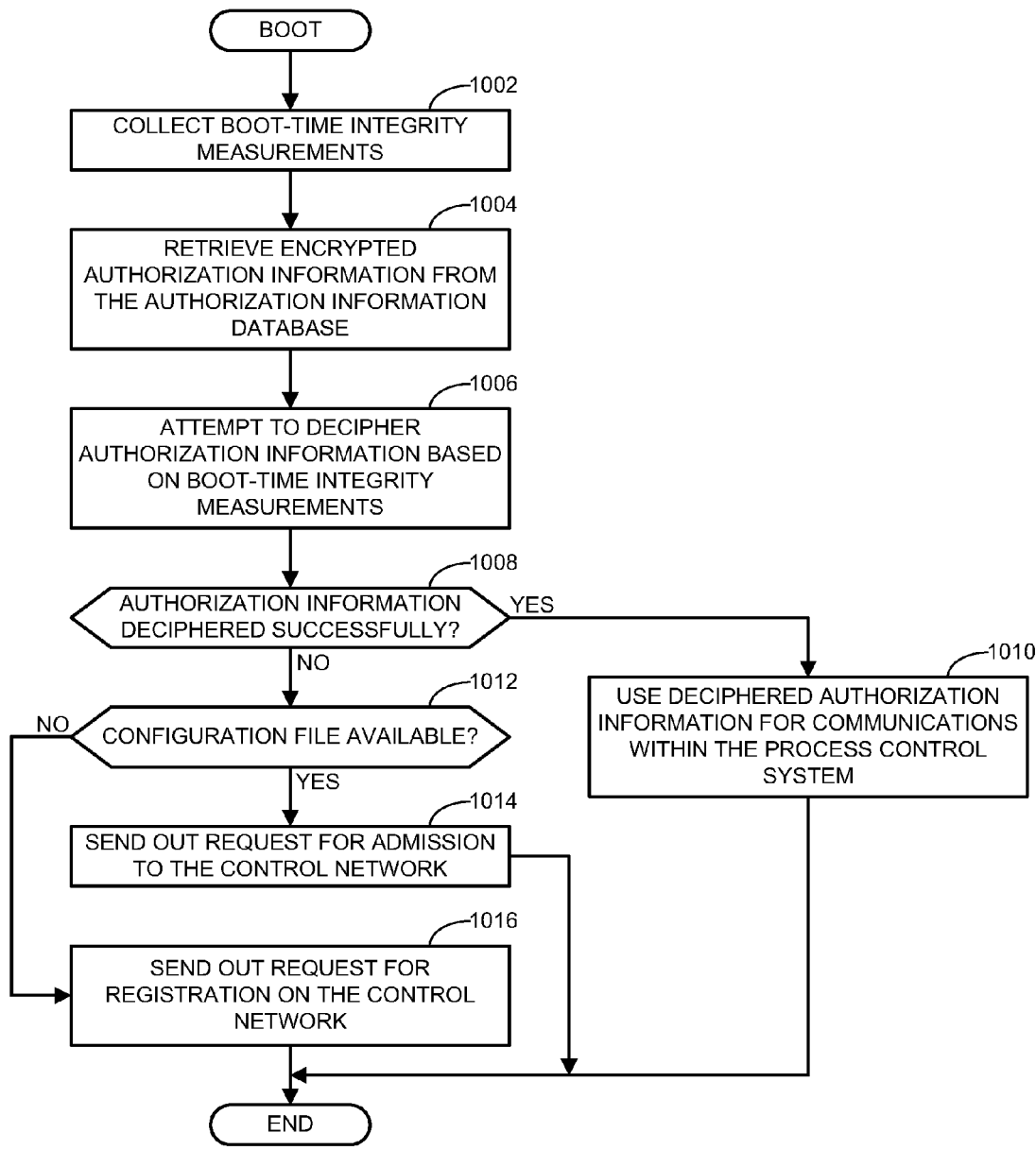

A flowchart representative of an example method for implementing the example CM 226 of FIG. 2 is shown in FIG. 7. Flowcharts representative of example methods for implementing the example IMM 230 of FIGS. 2 and/or 3 are shown in FIGS. 8-10. Flowcharts representative of example methods for implementing the example SIM 228 of FIGS. 2 and/or 3 are shown in FIGS. 11-16. The methods may be implemented using machine readable instructions that comprise programs for execution by a processor such as the processors 1712, 1812, 1910 shown in the example processor platforms 1700, 1800, 1900 discussed below in connection with FIGS. 17-19. The programs may be embodied in software stored on a tangible computer readable storage medium such as a CD-ROM, a floppy disk, a hard drive, a digital versatile disk (DVD), a Blu-ray disk, or a memory associated with the processors 1712, 1812, 1910, but the entire programs and/or parts thereof could alternatively be executed by a device other than the processors 1712, 1812, 1910 and/or embodied in firmware or dedicated hardware. Further, although the example programs are described with reference to the flowchart illustrated in FIG. 7-16, many other methods of implementing the example CM 226, the example IMM 230, and the example SIM 228 may alternatively be used. For example, the order of execution of the blocks may be changed, and/or some of the blocks described may be changed, eliminated, or combined.

As mentioned above, the example methods of FIGS. 7-16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 7-16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to the figures, FIG. 7 is a flowchart representative of an example method to implement the example configuration module (CM) 226 of FIGS. 2 and/or 4. The example method begins at block 700 where the example user interface receives configuration data for a control system (e.g., the control system 200 of FIG. 2). In some examples, the configuration data corresponds to all of the configuration parameters, logic, and inputs provided by an engineer to configure a control system. At block 702, the example user interface receives software and/or hardware reference values for endpoints in the control system. In some examples, the software reference values and the hardware reference values correspond to values entered by the engineer based on values specified by the manufacturer(s) of the endpoint devices. In some examples, the software and/or hardware values are collected at the same time as the configuration data. In other examples, the software and/or hardware data is collected separately from the configuration data. In some examples, no software and/or hardware reference values are collected. In such examples, the software and/or hardware reference values may be collected and/or generated at a later time as described below.

At block 704, the example configuration file generator 404 generates a configuration file based on the configuration data. At block 706, the example reference value generator 406 generates reference values for an endpoint in the control system based on the configuration file. In some examples, the reference values are generated by calculating one or more checksums for the configuration file and/or portions thereof assigned to the endpoint. In some examples, where software and hardware reference values were received at block 702, the generated reference values correspond to configuration reference values for the corresponding endpoint. In some examples, the generated reference values include hardware reference values (e.g., where such values are not user-defined at block 702). At block 708, the configuration reference generator 406 determines whether there is another endpoint with corresponding configuration data. If so, control returns to block 706 to calculate the corresponding configuration reference values for the endpoint. Otherwise, control advances to block 710 where the example communications interface 410 transmits the configuration file to the endpoints in the control system. Based on this transmission, each endpoint may receive and/or download and instantiate the configuration file (or relevant portions thereof) and then reboot to complete the configuration process as will be described in greater detail below. At block 712, the example communications interface 410 transmits the reference values (e.g., configuration reference values, software reference values, and/or hardware reference values) to a system integrity monitor (SIM) (e.g., the SIM 228 of FIG. 2). Thereafter, the example method of FIG. 7 ends.

FIG. 8 is a flowchart representative of an example method to implement the example integrity measurement module (IMM) 230 of FIGS. 2, 3, and/or 5 to generate boot-time integrity measurements for an endpoint. The example method of FIG. 8 executes when an endpoint implementing the IMM 230 boots, such as, for example, after receiving the configuration file described above in connection with block 710 of FIG. 7. In other examples, the endpoint may reboot based on a request to do so provided by the SIM 228. In other examples, the endpoint may be rebooted manually. At block 802, the example integrity measurement self-tester 504 tests the integrity measurement functionality of the IMM 230. For example, the integrity measurement self-tester 504 tests the checksum algorithm, hash algorithm, etc. to be used in generating integrity measurements based on known inputs and known outputs. At block 804, the example integrity measurement controller 506 determines whether the integrity measurement functionality is working properly (e.g., the outputs are as expected). If not, the example method of FIG. 8 ends. In some examples, the integrity measurement controller 506 generates an error message indicating the test failed before the method ends. If the example integrity measurement controller 506 determines that the integrity measurement functionality is working properly (block 804), control advances to block 806.

At block 806, the example integrity measurement controller 506 clears all of the integrity measurement registers 512, 514, 516. At block 808, the example integrity measurement generator 502 generates an integrity measurement for a piece of software (and/or firmware) loaded on the endpoint. For example, the integrity measurement generator 502 calculates a cryptographic checksum for the piece of software. At block 810, the example integrity measurement controller 506 adds the integrity measurement to the example software measurement register 512. At block 812, the example integrity measurement controller determines whether there is another piece of software to be loaded during the boot process. If so, control returns to block 808 where an integrity measurement is generated for that piece of software and then added to software measurement register 512 (block 810). In some examples, the integrity measurements associated with subsequent pieces of software are appended to the integrity measurements associated with previously generated integrity measurements for other pieces of software lower in the software stack (e.g., previously loaded during boot-time). In some examples, if the appended string of values becomes too long for the software measurement register 512, the example integrity measurement generator 502 may perform a hashing algorithm on the combined values to reduce them to a more manageable amount. If the example integrity measurement controller determines that there is no more software to be loaded during the boot process (block 812), control advances to block 814. The combined integrity measurements for all pieces of software (e.g., after any hashing) corresponds to the final software integrity measurement for the endpoint that may subsequently be reported to the SIM 228 upon request.

At block 814, the example integrity measurement generator 502 generates an integrity measurement for configuration data assigned to the endpoint. For example, the integrity measurement generator 502 calculates a cryptographic checksum for the configuration file or portion thereof stored in the endpoint. At block 816, the example integrity measurement controller 506 adds the integrity measurement to the example configuration measurement register 514. At block 818, the example integrity measurement controller determines whether there is more configuration data. If so, control returns to block 814 where an integrity measurement is generated for that configuration data and then added to configuration measurement register 514 (block 816). In some examples, the integrity measurements associated with subsequently analyzed configuration data are added to the register 514 by being appended to the integrity measurements associated with previously generated integrity measurements for other configuration data. In some examples, if the appended string of values becomes too long for the configuration measurement register 514, the example integrity measurement generator 502 may perform a hashing algorithm on the combined values to reduce them to a more manageable amount. If the example integrity measurement controller determines that there is no more configuration (block 818), control advances to block 820. The combined integrity measurements for all configuration data (e.g., after any hashing) corresponds to the final configuration integrity measurement for the endpoint that may subsequently be reported to the SIM 228 upon request.

At block 820, the example integrity measurement generator 502 generates an integrity measurement for a peripheral of the endpoint. For example, the integrity measurement generator 502 calculates a cryptographic checksum for a peripheral designated in the corresponding configuration file for the endpoint. At block 822, the example integrity measurement controller 506 adds the integrity measurement to the example hardware measurement register 516. At block 824, the example integrity measurement controller determines whether there is another peripheral. If so, control returns to block 820 where an integrity measurement is generated for that peripheral and then added to hardware measurement register 516 (block 816). In some examples, the integrity measurements associated with subsequent peripherals are added to the register 516 by being appended to the integrity measurements associated with previously generated integrity measurements for other peripherals. In some examples, if the appended string of values becomes too long for the hardware measurement register 516, the example integrity measurement generator 502 may perform a hashing algorithm on the combined values to reduce them to a more manageable amount (e.g., a shorter string using less memory). The combined integrity measurements for all peripherals (e.g., after any hashing) corresponds to the final hardware integrity measurement for the endpoint that may subsequently be reported to the SIM 228 upon request. If the example integrity measurement controller determines that there are no more peripherals (block 824), the example method of FIG. 8 ends.

FIG. 9 is a flowchart representative of an example method to implement the example integrity measurement module (IMM) 230 of FIGS. 2, 3, and/or 5 to generate runtime integrity measurements for an endpoint. That is, the example method of FIG. 9 occurs after an endpoint has been configured and admitted to a network and is in operation. The example method of FIG. 9 begins at block 902 where the example communications interface 510 receives a request from a system integrity monitor (e.g., the example SIM 228 of FIGS. 2, 3, and/or 6) for runtime integrity measurements. In some examples, the request includes a nonce value that is to be used in generating the response. Additional detail regarding the SIM 228 and scenarios when such a request may be received is described below in connection with FIGS. 11-13. At block 904, the example integrity measurement self-tester 504 tests the integrity measurement functionality of the IMM 230. At block 906, the example integrity measurement controller 506 determines whether the integrity measurement functionality is working properly (e.g., the outputs are as expected). If not, the example method of FIG. 9 ends. In some examples, the integrity measurement controller 506 generates an error message indicating the test failed before the method ends. If the example integrity measurement controller 506 determines that the integrity measurement functionality is working properly (block 906), control advances to block 908.

At block 908, the example integrity measurement controller 506 clears the configuration and hardware integrity measurement registers 514, 516. In some examples, the software measurement register 512 is not cleared in connection with a runtime integrity measurement as implemented in the example method of FIG. 9 because software integrity measurements are generated when the endpoint loads software during boot-time. In this manner, previously collected software integrity measurements stored in the software measurement register 512 generated during the last boot of the endpoint may still be available for reporting.

At block 910, the example integrity measurement generator 502 generates an integrity measurement for configuration data assigned to the endpoint. In some examples, the configuration data assigned to the endpoint is based on the configuration file and/or portions thereof stored on the endpoint. At block 912, the example integrity measurement controller 506 adds the integrity measurement to the example configuration measurement register 514. At block 914, the example integrity measurement controller determines whether there is more configuration data. If so, control returns to block 910 where an integrity measurement is generated for that configuration data and then added to configuration measurement register 514 (block 912). In some examples, the integrity measurements associated with subsequently analyzed configuration data are added to the register 514 by being appended to the integrity measurements associated with previously generated integrity measurements for other configuration data. In some examples, if the appended values become too long for the configuration measurement register 514, the example integrity measurement generator 502 may perform a hashing algorithm on the combined values to reduce them to a more manageable amount. If the example integrity measurement controller determines that there is no more configuration data (block 914), control advances to block 916. The combined integrity measurements for all configuration data assigned to the endpoint (e.g., after any hashing) corresponds to the final configuration integrity measurement for the endpoint.

At block 916, the example integrity measurement generator 502 generates an integrity measurement for a peripheral of the endpoint. At block 918, the example integrity measurement controller 506 adds the integrity measurement to the example hardware measurement register 516. At block 920, the example integrity measurement controller determines whether there is another peripheral. If so, control returns to block 916 where an integrity measurement is generated for that peripheral and then added to hardware measurement register 516 (block 918). In some examples, the integrity measurements associated with subsequent peripherals are added to the hardware measurement register 516 by being appended to the integrity measurements associated with previously generated integrity measurements for other peripherals. In some examples, if the appended values become too long for the hardware measurement register 516, the example integrity measurement generator 502 may perform a hashing algorithm on the combined values to reduce them to a more manageable amount. The combined integrity measurements for all peripherals (e.g., after any hashing) corresponds to the final hardware integrity measurement for the endpoint.

If the example integrity measurement controller determines that there are no more peripherals (block 920), control advances to block 922 where the example communications interface 510 sends a report of the integrity measurements. In some examples, the reported integrity measurements include the software integrity measurement stored in the software measurement register 512 (previously generated during the last boot of the endpoint), the configuration integrity measurement stored in the configuration measurement register 514 (generated at block 912), and the hardware integrity measurement stored in the hardware measurement register 516 (generated at block 918). In some examples, the report of the integrity measurements are provided along with the nonce value provided with the request for the measurements. After reporting the integrity measurements, the example method of FIG. 9 ends.

FIG. 10 is a flowchart representative of example methods to implement the example integrity measurement modules (IMM) 230 of FIGS. 2, 3, and/or 5 to limit the use of authorization information provided to an endpoint to circumstances where the endpoint is in a trusted state. As described above, communications are enabled through authorization information provided to an endpoint from which the endpoint generates secret and/or public values or keys. In some examples, the endpoint stores the authorization information in an encrypted form that can only be accessed (decrypted) when the endpoint is in the same state as when the authorization information was encrypted. In some examples, the authorization information is provided to the endpoint after the integrity of the endpoint is verified such that the endpoint is in a trusted state when the authorization information is encrypted. Thus, in some examples, if an endpoint is compromised so as to no longer be in a trusted state (e.g., integrity measurements would no longer match reference values), the endpoint will not be able to use the authorization information because the endpoint will not be able to decrypt the authorization information. In this manner, communications from a potentially compromised endpoint can be prevented without the endpoint having to be specifically tested by a SIM 228 as described more fully below.

The example method of FIG. 10 begins when an endpoint implementing the IMM 230 boots. In the illustrated example, this is a boot occurring after the IMM 230 has already been configured and received authorization information that has been stored in an encrypted form in the authorization information database 518. The example method of FIG. 10 begins at block 1002 where the example integrity measurement generator 502 collects boot-time integrity measurements (e.g., by implementing the example method of FIG. 8). At block 1004, the example communications authenticator 508 retrieves encrypted authorization information from the authorization information database 518. At block 1006, the example communications authenticator 508 attempts to decipher the authorization information based on the boot-time integrity measurements. That is, in some examples, the communications authenticator 508 uses the state of the endpoint indicated by the integrity measurements to decrypt the encrypted authorization information.

At block 1008, the example communications authenticator 508 determines whether the authorization information was deciphered successfully. If so, this indicates that the state of the endpoint is in the expected state of integrity (e.g., a trusted state) and the endpoint will be able to access and, thus, use the authorization information to communicate. Accordingly, at block 1010, the example communications interface 510 uses the deciphered authorization information for communications within the control system. Thereafter, the example method of FIG. 10 ends.

If the example communications authenticator 508 determines that the authorization information was not deciphered successfully (block 1008), control advances to block 1012. An unsuccessful attempt to decipher the encrypted authorization information indicates that something about the state of the endpoint (as indicated by the integrity measurements) is inconsistent with the desired state (e.g., integrity) of the endpoint. At block 1012, the example integrity measurement controller 506 determines whether the configuration file is available. If so, control advances to block 1014, where the example communications interface 510 sends out a request for admission to the control network. In some examples, this request may initiate the example method of FIG. 12 described below. Thereafter, the example method of FIG. 10 ends. Returning to block 1012, if the example integrity measurement controller 506 determines that the configuration file is not available, control advances to block 1016 before the example method of FIG. 10 ends. At block 1016, the example communications interface 510 sends out a request for registration on the control network. In some examples, this request corresponds to beginning of the example method of FIG. 11 described below.

Figure 11:
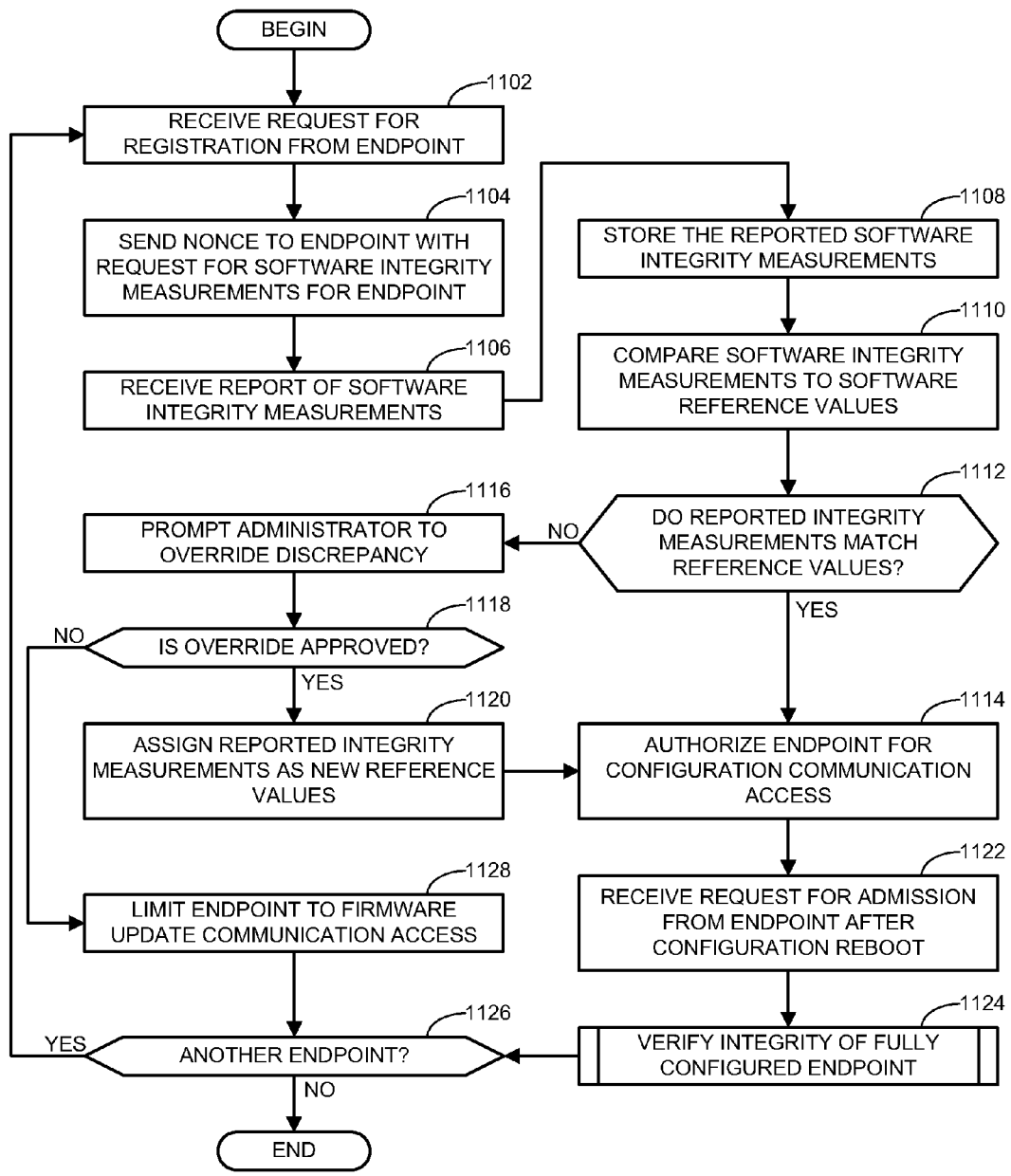
FIGS. 11-16 are flowcharts representative of example methods that may be carried out to implement the example system integrity monitors of FIGS. 2, 3, and/or 6.

FIG. 11 is a flowchart representative of an example method to implement the example system integrity monitor 228 of FIGS. 2, 3, and/or 6 to check the integrity of an endpoint initially registering on an associated control network. The example method begins at block 1102 where the example communications interface 602 receives a request for registration from an endpoint. Registration of the endpoint refers to the connection and identification of the endpoint as a node or endpoint on the control network corresponding to the control system in which the endpoint is to be implemented that has not previously been connected or does not have valid configuration data (e.g., the request at block 1016 of FIG. 10). At block 1104, the example communications interface 602 sends a nonce (e.g., generated by the example authorization controller 606) to the endpoint with a request for software integrity measurements for the endpoint. In some examples, the nonce serves to detect a "lying endpoint" (e.g., an endpoint simply repeating previously generated values). In the illustrated example, it is assumed that the endpoint is a newly implemented device that has not yet been configured (or a device that no longer has valid configuration data) such that corresponding configuration and/or hardware integrity measurements would not produce valid results matching corresponding reference values. Thus, in the illustrated example, software integrity measurements are requested while other types of integrity measurements (e.g., hardware and/or configuration integrity measurements) are not. However, in some examples, the hardware and/or configuration integrity measurements may nevertheless be requested with the software integrity measurements at block 1104.

At block 1106, the example communications interface 602 receives a report of the software integrity measurements. In some examples, the reported software integrity measurements correspond to whatever values are stored in the software measurement register 512 as previously generated when the endpoint was initially booted as described above in connection with FIG. 8. At block 1108, the example integrity measurement database 618 stores the reported software integrity measurements. In some examples, the integrity measurements are stored for subsequent comparison to reference values and/or for integrity verification of the entire control system (as an integrated whole) to a supervisory system as described more fully below in connection with FIG. 16.

At block 1110, the example integrity measurement comparator 604 compares the software integrity measurements to software reference values. In some examples, the software reference values have been previously entered by a user via the user interface 614 based on data provided by the manufacturer of the endpoint device. In this manner, the reference values can be set independent of direct feedback from the endpoint, thereby removing the possibility of the endpoint having been tampered with after the endpoint device left possession of the manufacturer but before the endpoint is connected to the network (e.g., during shipment). In some examples, the hardware and/or configuration reference values may also be entered by an engineer or other personnel. In other examples, the software reference values are obtained based on the initial software integrity measurements received at block 1106 as described more fully below. Likewise, in some examples, the initial data to set the hardware and/or configuration reference values may be obtained from an initial calculation of the corresponding integrity measurements.

At block 1112, the example integrity measurement comparator 604 determines whether the reported integrity measurements match the reference values. If the reference values were previously entered manually by a user and the endpoint has not been altered since leaving the manufacturer, the software integrity measurements should match the reference values. If so, control advances to block 1114 where the example authorization controller 606 authorizes the endpoint for configuration communications access. In some examples, configuration communications access enables the endpoint to receive configuration data to be used to configure the endpoint (e.g., based on the configuration file describe in connection with FIG. 7 above).

If the integrity measurements do not match the reference values (block 1112), control advances to block 1116 where the example integrity monitor controller 612 prompts an administrator to override the discrepancy. In some examples, integrity measurements may not match reference values when an endpoint is being initially implemented (e.g., a newly acquired and/or installed device) and the reference values were not previously entered manually via the user interface 614. Accordingly, the prompt provided at block 1116 enables an administrator to accept the initially reported integrity measurements as the new reference values if they correspond to the desired values. Thus, at block 1118, the example integrity monitor controller 612 determines whether the override is approved. If so, control advances to block 1120 where the example integrity monitor controller 612 assigns the reported integrity measurements as the new reference values. In this manner, the software reference values can be initially set based on the integrity measurements of the endpoint without requiring manual entry of the values as described above. In such examples, because the reported integrity measurements are assigned as the reference values at block 1120, the integrity measurements and the reference values necessarily match such that control advances to block 1114 to authorize the endpoint for configuration communications access.

Once the endpoint is authorized for configuration communications access (block 1114), the configuration file may be sent to the endpoint from the configuration module 226 as described above in connection with FIG. 7. Thereafter, the endpoint may reboot to complete the configuration process. In this manner, the endpoint may acquire valid configuration data such that each of the software, hardware, and configuration integrity measurement should reflect the proper state of the endpoint so as to verify the integrity of the endpoint. At block 1122, the example communications interface 602 receives a request for admission from the endpoint after a configuration reboot. Admission of the endpoint refers to the endpoint being admitted into communication (e.g., enable communications) with other endpoints in the control network associated with the control system in which the endpoint is to be implemented and onto which the endpoint is already registered (e.g., at block 1114 in response to the request for registration at block 1102). At block 1124, the example integrity monitor controller 612 verifies the integrity of the fully configured endpoint. An example method to verify the integrity of the fully configured endpoint is described more fully below in FIG. 12. At block 1126, the example integrity monitor controller 612 determines whether there is another endpoint to be admitted to the control network of the control system. If so, control returns to block 1102. Otherwise, the example method of FIG. 11 ends.

Returning to block 1118, if the example integrity monitor controller 612 determines the override is not approved (e.g., the administrator does not want to use the software integrity measurement reported by the endpoint as the new reference value), control advances to block 1128 where the example authorization controller 606 limits the endpoint to firmware update communications access. In some examples, firmware update communications access limits the endpoint to receive firmware updates but does not otherwise allow communications with the endpoint. After limiting the communications access of the endpoint (block 1128), control advances to block 1126 where the example integrity monitor controller determines whether example method is to end or repeat for another endpoint.

Figure 12:
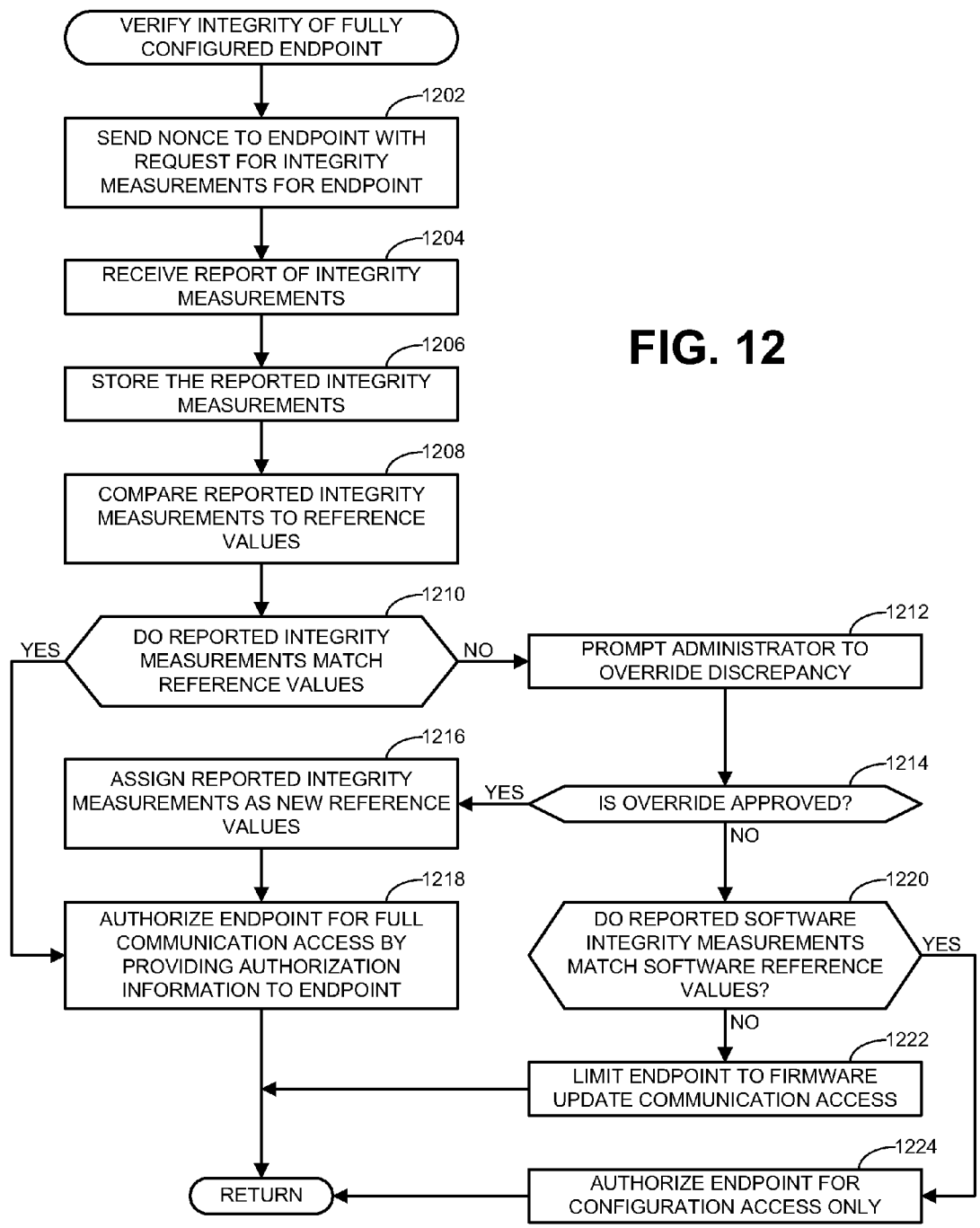

FIG. 12 is a flowchart representative of an example method to implement the example system integrity monitor 228 of FIGS. 2, 3, and/or 6 to check the integrity of an endpoint seeking communication access in a control network of a control system. More particularly, the example method of FIG. 12 corresponds to block 1124 of FIG. 11. The example method of FIG. 12 begins at block 1202 where the example communications interface 602 sends a nonce (e.g., generated by the example authorization controller 606) to the endpoint with a request for integrity measurements for the endpoint. In contrast to block 1104 of FIG. 11 where only software integrity measurements were requested, the example communications interface 602 may request values for each of the software, hardware, and configuration integrity measurements because the endpoint is, at this point, fully configured and the reference value database 616 has all relevant reference values to compare with such integrity measurements. In some examples, the verification of the software (FIG. 11) is accomplished first to ensure the endpoint, as provided by the manufacturer is operating as expected before verifying that the endpoint has been configured properly (FIG. 12) for the particular application to which the endpoint is being used. In some examples, the example methods of FIGS. 11 and 12 may be combined such that the software, hardware, and configuration integrity of the endpoint is verified at one time.

At block 1204, the example communications interface 602 receives a report of the integrity measurements. In some examples, the integrity measurements are based on calculations made during runtime. In some such examples, the reported software integrity measurements correspond to previously stored values in the software measurement register 512 because the endpoint is not rebooted to obtain new measurements. That is, the software integrity measurements may correspond to the values previously generated when the endpoint was last booted (e.g., immediately preceding block 1122 in FIG. 11). By contrast, in some examples, the hardware and configuration integrity measurements are newly generated during runtime. At block 1206, the example integrity measurement database 618 stores the reported integrity measurements.

At block 1208, the example integrity measurement comparator 604 compares the reported integrity measurements to reference values. In some examples, the reference values correspond to the values received at block 1102 and/or assigned at block 1120 of FIG. 11. At block 1210, the example integrity measurement comparator 604 determines whether the reported integrity measurements match the reference values. If not, control advances to block 1212 where the example integrity monitor controller 612 prompts an administrator to override the discrepancy. In some examples, the prompt enables an administrator to accept the reported integrity measurements as the new reference values. At block 1214, the example integrity monitor controller 612 determines whether the override is approved. If so, control advances to block 1216 where the example integrity monitor controller 612 assigns the reported integrity measurements as the new reference values whereupon control advances to block 1218.

At block 1218, the example authorization controller 606 authorizes the endpoint for full communications access by providing authorization information to the endpoint. In some examples, full communications access enables the endpoint to fully communicate with other endpoints within the control network in which the endpoint is implemented. In some examples, full communications access is enabled by providing authorization information to the endpoint that is used by the endpoint to generate secret and/or public values. Returning to block 1210, if the example integrity measurement comparator 604 determines that the reported integrity measurements do match the reference values, control advances directly to block 1218. Once the endpoint is authorized for full communications access (block 1218), the example method of FIG. 12 ends and returns to complete the example method of FIG. 11.

Returning to block 1214, if the example integrity monitor controller 612 determines the override is not approved (e.g., the administrator does not want to use the reported integrity measurement as the new reference values), control advances to block 1220 where the example integrity measurement comparator 604 determines whether the reported software integrity measurements match the software reference values. If not, then the software on the endpoint is suspect. Accordingly, control advances to block 1222 where the example authorization controller 606 limits the endpoint to firmware update communications access. After limiting the communications access of the endpoint (block 1222), the example method of FIG. 12 ends and returns to complete the example method of FIG. 11. Returning to block 1220, if the example integrity measurement comparator 604 determines that the reported software integrity measurements do match the software reference values, control advances to block 1224. At block 1224, the example authorization controller 606 limits the endpoint to configuration communications access. Thereafter, the example method of FIG. 12 ends and returns to complete the example method of FIG. 11.

Figure 13:
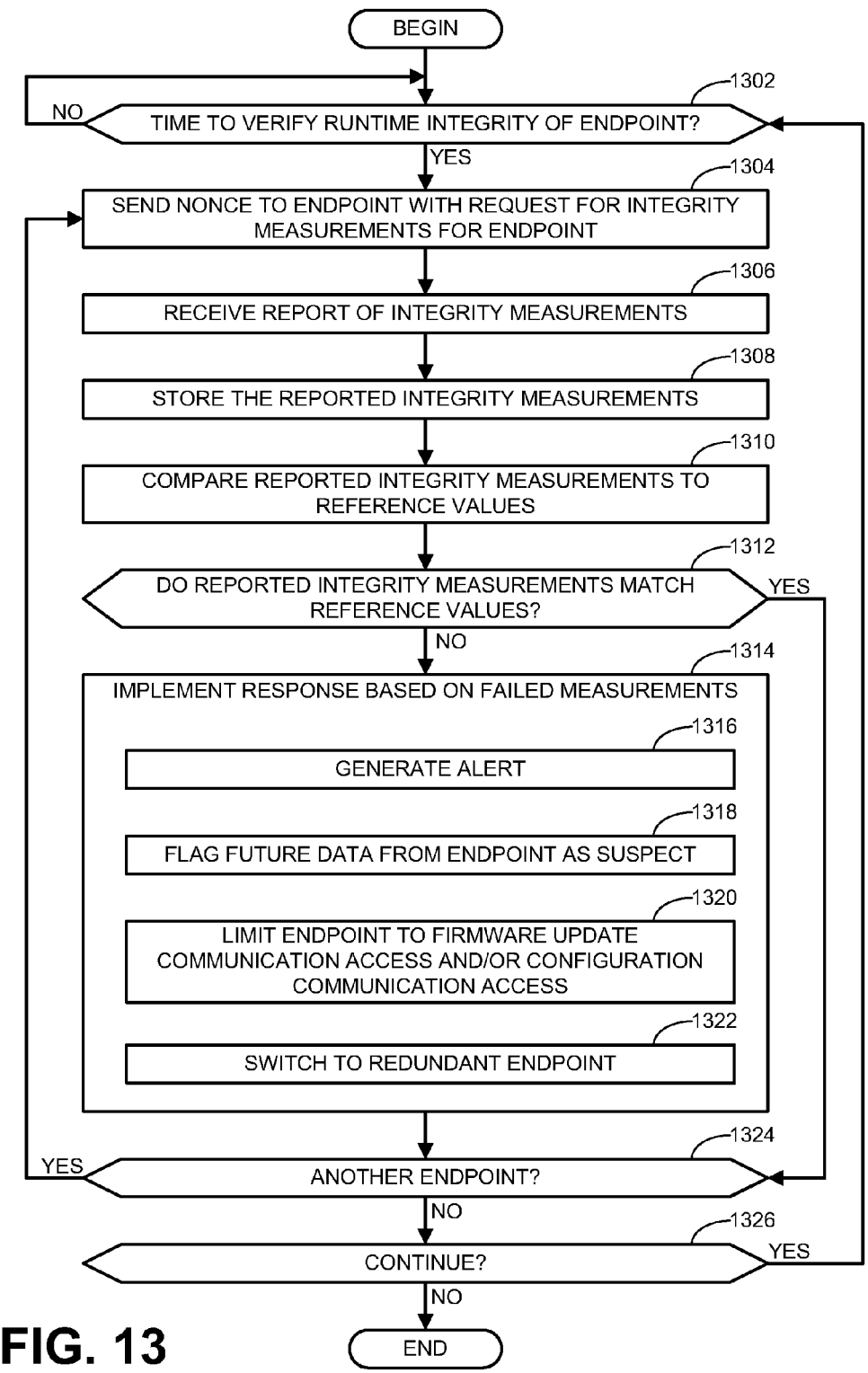

FIG. 13 is a flowchart representative of an example method to implement the example system integrity monitor 228 of FIGS. 2, 3, and/or 6 to check the integrity of an endpoint in a control network of a control system during runtime. That is, whereas FIGS. 11 and 12 represent an example method to verify the integrity of an endpoint being initially setup and configured on a control network, FIG. 13 represents verification of the integrity of the endpoint at a later point in time while the endpoint is operating and/or in service. In this manner, potential security breaches occurring after the endpoint has already been acquired, installed, and configured for use may be detected and responded to accordingly.

The example method of FIG. 13 begins at block 1302 where the example integrity monitor controller 612 determines whether it is time to verify the runtime integrity of an endpoint. Many computing devices (endpoints) in a control system may remain in operation for extended periods of time (e.g., months or years) without being turned off or rebooted. As such, while verifying the integrity of an endpoint during boot-time is useful to confirm the state of the software stack (loaded during the boot), such tests may not occur at sufficient regularity to detect potential changes to the endpoint. Accordingly, in some examples, a user may define runtime integrity on a periodic or aperiodic schedule that is more regular and/or frequent. In some examples, runtime integrity measurements are performed once a day for each endpoint in a network. However, runtime integrity tests may be implemented on any suitable schedule. Further, in some examples, certain endpoints may be tested more frequently than others based on, for example, how critical the endpoint is to the control system in which it operates (e.g., hourly for critical endpoints). Additionally or alternatively, in some examples, only certain types of integrity measurements (software, hardware, or configuration) are requested at a particular point in time. In some examples, a separate schedule may be applied for the monitoring of each of the software, hardware, and configuration integrity measurements. If the example integrity monitor controller 612 determines that it is not time to verify the runtime integrity of an endpoint (block 1302), the example integrity monitor controller 612 waits until it is time.

Once it is time to verify the runtime integrity of the endpoint, control advances to block 1304 where the example communications interface 602 sends a nonce (e.g., generated by the example authorization controller 606) to the endpoint with a request for integrity measurements for the endpoint. At block 1306, the example communications interface 602 receives a report of the integrity measurements. In some examples, the integrity measurements are based on calculations made during runtime. However, in some examples, the software integrity measurements are based on integrity measurements generated when the endpoint last booted such that new software integrity measurements will not be created during runtime. Rather, in such examples, the software integrity measurements correspond to the values previously generated when the endpoint was last booted. By contrast, in some examples, the hardware and configuration integrity measurements are newly generated during runtime. At block 1308, the example integrity measurement database 618 stores the reported integrity measurements.

At block 1310, the example integrity measurement comparator 604 compares the reported integrity measurements to reference values. At block 1312, the example integrity measurement comparator 604 determines whether the reported integrity measurements match the reference values. If not, control advances to block 1314 where the example integrity monitor controller 612 implements a response based on the failed integrity measurements. In some examples, the particular response depends upon which type of integrity measurement (e.g., software, hardware, and/or configuration) failed to match the reference values. In some examples, the nature of the response depends upon the nature of the endpoint and/or its configuration and relationship with other endpoints in the corresponding network. In some examples, the response includes generating an alert (block 1316), flagging future data from the endpoint as suspect (block 1318), limiting the endpoint to firmware update communications access and/or to configuration communications access (block 1320), and/or switching to a redundant endpoint (block 1322). In some examples, the response includes a combination of more than one of blocks 1316, 1318, 1320, 1322. In some examples, the response implemented is defined by a user when the endpoint is configured. After the appropriate response has been implemented (block 1314), control advances to block 1324. Returning to block 1312, if the example integrity measurement comparator 604 determines that the integrity measurements match the reference values, then the integrity of the endpoint is verified and no further action is needed. In such examples, control advances to directly to block 1324

At block 1324, the example integrity monitor controller 612 determines whether there is another endpoint to be verified. If so, control returns to block 1302. Otherwise, control advances to block 1326 where the example integrity monitor controller 612 determines whether to continue. If so, control returns to block 1302. Otherwise, the example method of FIG. 13 ends.

FIGS. 11-13 described above correspond to implementing the SIM 228 within a primary workstation of a control system (e.g., the control system 200 of FIG. 2) that is at the control system level 106 of the hierarchy 100 of FIG. 1. Thus, FIGS. 11-13 relate to the configuration and integrity-based authorization of communications access for process control devices (e.g., controllers, I/O devices, field devices, etc.) at the device level 104 of the hierarchy 100 level on a control network associated the control system level 106 of the hierarchy 100. Additionally or alternatively, FIGS. 11-13 relate to the configuration and integrity-based authorization of communications between different endpoints (e.g., workstations, servers, etc.) at the control system level 106 over a control network associated with the control system level 106. Thus, in some examples, the SIM 228 associated with FIGS. 11-13 is implemented in a primary workstation designated for the control network for which communications are being authorized (e.g., the primary workstation 220 of FIG. 2). Further, in such examples, the IMM 230 is implemented in endpoints corresponding to particular devices communicatively coupled to the control network.

Figure 14:
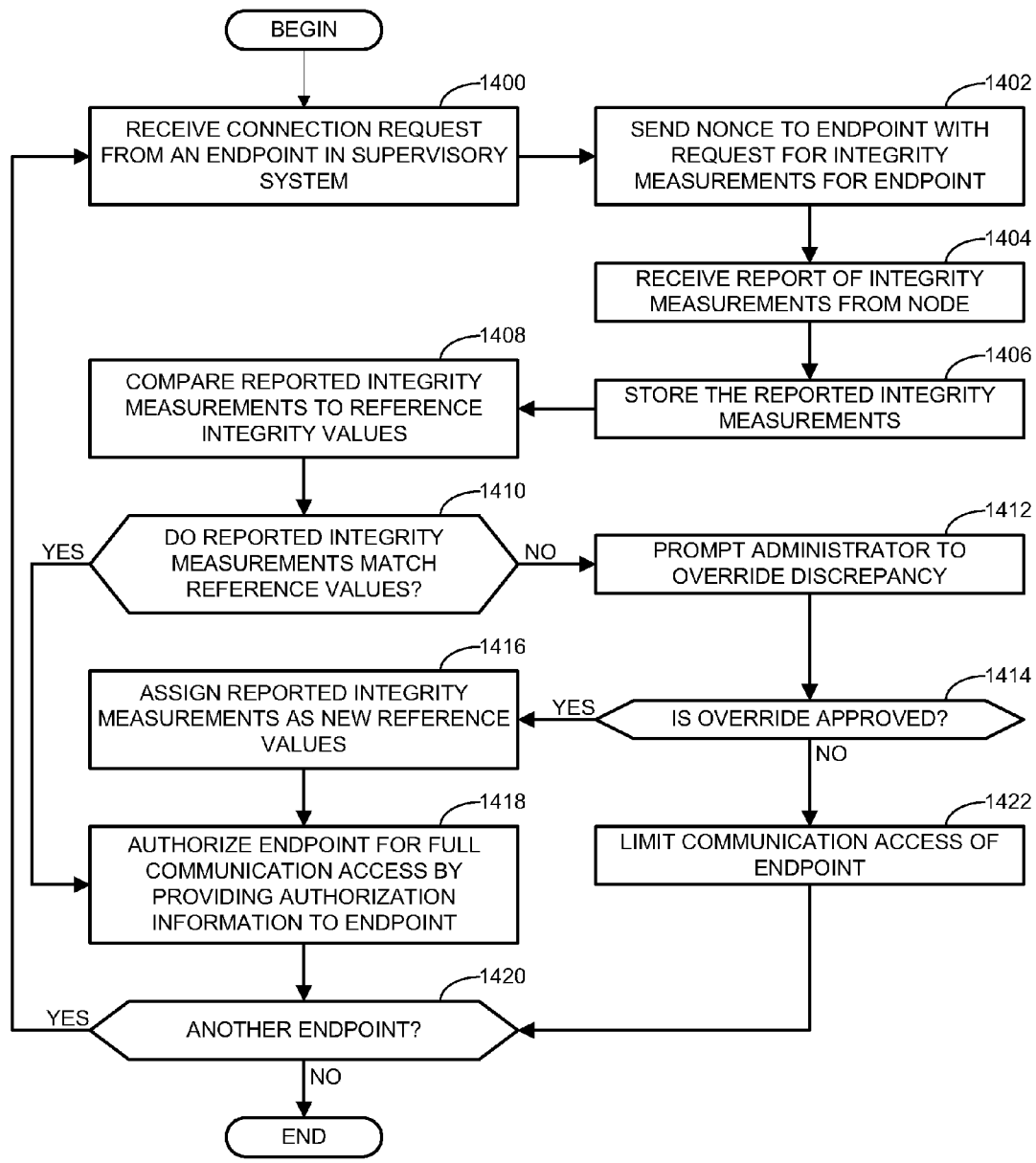
Figure 15:
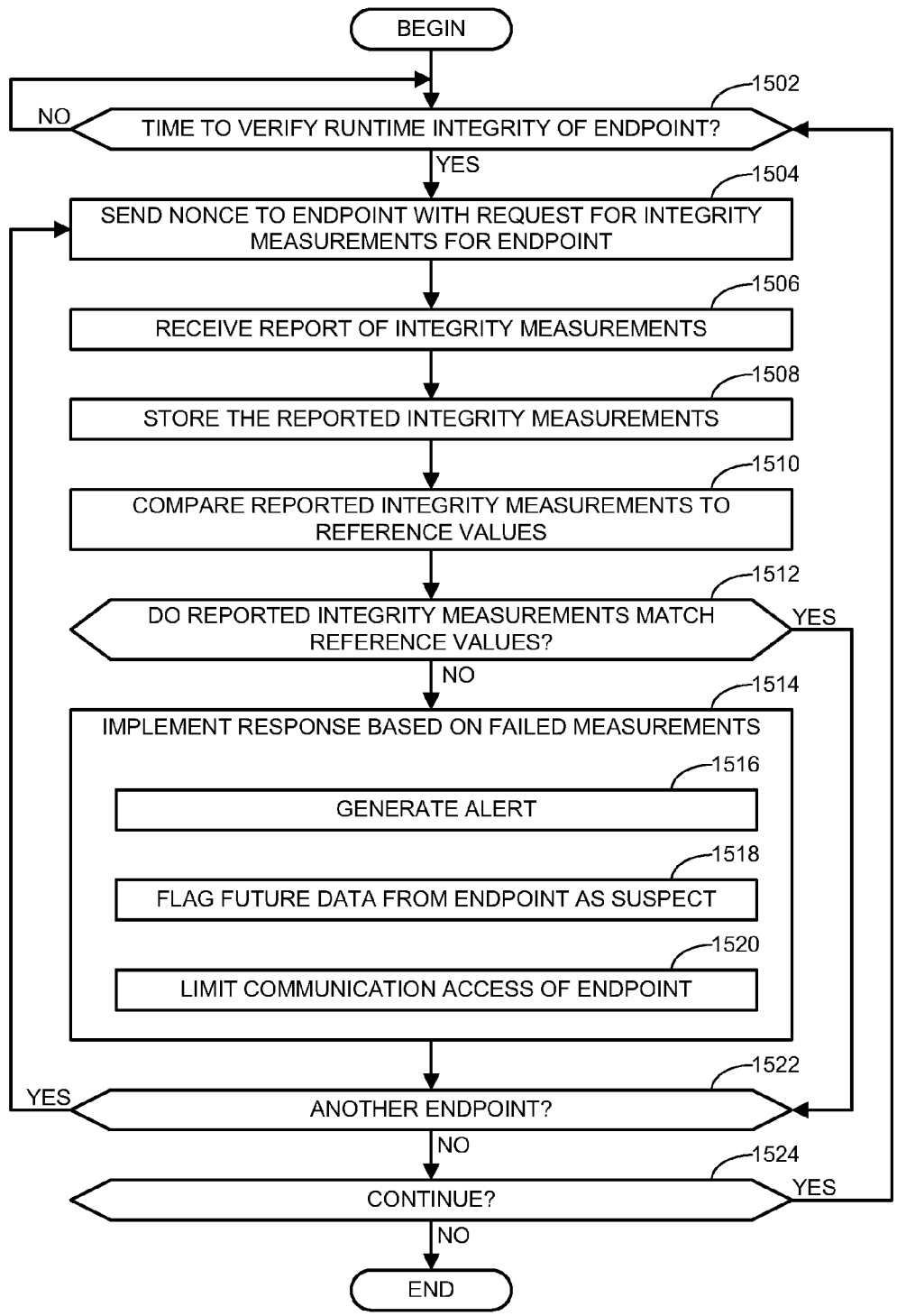

By contrast, FIGS. 14-15 described below correspond to implementing the SIM 228 within a primary workstation of a supervisory system (e.g., the supervisory system 300 of FIG. 3) that is at the supervisory system level 108 of the hierarchy 100 of FIG. 1. Thus, FIGS. 14-15 relate to the integrity-based authorization of communications access for endpoints in a supervisory system (e.g., the supervisory system 300 of FIG. 3) associated with the supervisory system level 108 of FIG. 1 and/or between a subordinate system (e.g., the control systems 200, 302 of FIG. 3) at the control system level 106 and other endpoints at the supervisory system level 108. Thus, in some examples, the SIM 228 referenced in association with FIGS. 14-15 is implemented in a primary workstation designated for the supervisory network for which communications are being authorized (e.g., the primary workstation 306 of FIG. 3). Further, in such examples, the endpoints to be admitted to the supervisory network 310 correspond to individual computing devices (e.g., the workstation(s) 308, the server(s) 304, etc.) implementing an IMM 230. Additionally or alternatively, in some examples, the endpoints to be admitted to the supervisory network 310 correspond to a subordinate system to the supervisory system at the control system level 106 (e.g., the control system 200). In some such examples, the SIM 228 implemented in the primary workstation associated with the subordinate system (e.g., the primary workstation 220 of the control system 200) provides integrity measurements requested by the SIM 228 implemented in the workstation of the supervisory system as described below in connection with FIG. 16.

FIG. 14 is a flowchart representative of an example method to implement the example system integrity monitor 228 of FIGS. 2, 3, and/or 6 to verify the integrity of an endpoint seeking admission to a supervisory system. In the illustrated example, the SIM 228 corresponds to a SIM implemented in a primary workstation of the supervisory system (e.g., the primary workstation 306 of the supervisory system 300). The example method of FIG. 14 begins at block 1400 where the example communications interface 602 receives a connection request from an endpoint in the supervisory system. In some examples, the request comes from a particular endpoint (e.g., a workstation 308, a server 304, etc.) communicatively coupled to the supervisory network of the supervisory system. In some examples, the request comes from a primary workstation of a subordinate system (e.g., the primary workstation 220 of the control system 200). At block 1402, the example communications interface 602 sends a nonce (e.g., generated by the example authorization controller 606) to the endpoint with a request for integrity measurements for the endpoint.

At block 1404, the example communications interface 602 receives a report of the integrity measurements. In some examples, the integrity measurements for an endpoint at the supervisory system level 108 are generated by the IMM implemented by the endpoint in the same or similar manner described above for an IMM implemented by an endpoint at the control system level 106. However, a supervisory system typically does not have a specifically designated configuration as is the case with a control system. Accordingly, in some examples, the reported integrity measurements do not include configuration integrity measurements. On the other hand, in some examples, where the endpoint corresponds to a control system, the integrity measurements may include a value corresponding to the combination of configuration integrity measurements from all endpoints within the control system as described more fully below in connection with FIG. 16. At block 1406, the example integrity measurement database 618 stores the reported integrity measurements.

At block 1408, the example integrity measurement comparator 604 compares the reported integrity measurements to reference values. At block 1410, the example integrity measurement comparator 604 determines whether the reported integrity measurements match the reference values. If not, control advances to block 1412 where the example integrity monitor controller 612 prompts an administrator to override the discrepancy. At block 1414, the example integrity monitor controller 612 determines whether the override is approved. If so, control advances to block 1416 where the example integrity monitor controller 612 assigns the reported integrity measurements as the new reference values. At block 1418, the example authorization controller 606 authorizes the endpoint for full communications access by providing authorization information to the endpoint. Returning to block 1410, if the example integrity measurement comparator 604 determines that the reported integrity measurements does match the reference values, control advances directly to block 1418. At block 1420, the example integrity monitor controller 612 determines whether there is another endpoint. If so, control returns to block 1400. Otherwise, the example method of FIG. 14 ends.

Returning to block 1414, if the example integrity monitor controller 612 determines the override is not approved (e.g., the administrator does not want to use the reported integrity measurement as the new reference values), control advances to block 1422. At block 1422, the example authorization controller 606 limits the communications access of the endpoint. In some examples, the communications access is denied (i.e., no communications access is provided). In some examples, the endpoint is limited to firmware update communications access. In other examples, communications may be enabled but the data from the particular node is flagged or labeled as suspect. In some examples, communications access may be provided to certain endpoints on the supervisory system while communication to other endpoints is prevented. After limiting the communications access of the endpoint (block 1422), control advances to block 1420 where the example integrity monitor controller 612 determines whether there is another endpoint as described above.

FIG. 15 is a flowchart representative of an example method to implement the example system integrity monitor 228 of FIGS. 2, 3, and/or 6 to check the integrity of an endpoint in a supervisory network of a supervisory system during runtime. That is, whereas FIG. 14 represents an example method to verify the integrity of an endpoint being initially admitted to the supervisory system, FIG. 15 represents verification of the integrity of the endpoint at a later point in time while the endpoint is operating and/or in service. In this manner, potential security breaches occurring after the endpoint has already been acquired, installed, and configured for use may be detected and responded to accordingly. As described above, in the illustrated example of FIG. 15, the SIM 228 corresponds to a SIM implemented in a primary workstation of a supervisory system (e.g., the primary workstation 306 of the supervisory system 300).

The example method of FIG. 15 begins at block 1502 where the example integrity monitor controller 612 determines whether it is time to verify the runtime integrity of an endpoint. In some examples, runtime integrity measurements are performed on any suitable periodic or aperiodic schedule. For example, runtime integrity measurements may be requested once a day for each endpoint in a network. Further, in some examples, certain endpoints may be tested more frequently than others based on, for example, how critical the endpoint is to the supervisory system in which the endpoint operates. If the example integrity monitor controller 612 determines that it is not time to verify the runtime integrity of an endpoint (block 1502), the example integrity monitor controller 612 waits until it is time.

Once it is time to verify the runtime integrity of the endpoint, control advances to block 1504 where the example communications interface 602 sends a nonce (e.g., generated by the example authorization controller 606) to the endpoint with a request for integrity measurements for the endpoint. At block 1506, the example communications interface 602 receives a report of the integrity measurements. In some examples, the integrity measurements for an endpoint at the supervisory system level 108 are generated by the IMM implemented by the endpoint in the same or similar manner described above for an IMM implemented by an endpoint at the control system level 106. However, in some examples, the integrity measurements do not include a configuration integrity measurement because supervisory systems do not typically have configuration files defining how the system is to be configured. On the other hand, in some examples, where the endpoint corresponds to a control system, the integrity measurements may include values corresponding to the combination of configuration integrity measurements from all endpoints within the control system as described more fully below in connection with FIG. 16. At block 1508, the example integrity measurement database 618 stores the reported integrity measurements.

At block 1510, the example integrity measurement comparator 604 compares the reported integrity measurements to reference values. At block 1512, the example integrity measurement comparator 604 determines whether the reported integrity measurements match the reference values. If not, control advances to block 1514 where the example integrity monitor controller 612 implements a response based on the failed integrity measurements. In some examples, the particular response depends upon which type of integrity measurement (e.g., software, hardware, and/or configuration) failed to match the reference values. In some examples, the nature of the response depends upon the nature of the endpoint and/or its relationship with other endpoints in the corresponding network. In some examples, the response includes generating an alert (block 1516), flagging future data from the endpoint as suspect (block 1518), and/or limiting the communications access of the endpoint (block 1520). In some examples, the communications access is denied (i.e., no communications access is provided). In some examples, the endpoint is limited to firmware update communications access. In other examples, communications may be enabled but the data from the particular node is flagged or labeled as suspect. In some examples, communications access may be provided to certain endpoints on the supervisory system while communication to other endpoints is prevented. In some examples, the response includes a combination of more than one of blocks 156, 158, 1520, and 1522. In some examples, the response implemented is defined by a user when the endpoint is configured.

After the appropriate response has been implemented (block 1514), control advances to block 1522. Returning to block 1512, if the example integrity measurement comparator 604 determines that the integrity measurements match the reference values, then the integrity of the endpoint is verified and no further action is needed. In such examples, control advances directly to block 1522. At block 1522, the example integrity monitor controller 612 determines whether there is another endpoint to be verified. If so, control returns to block 1504. Otherwise, control advances to block 1524 where the example integrity monitor controller 612 determines whether to continue. If so, control returns to block 1502. Otherwise, the example method of FIG. 15 ends.

Figure 16:
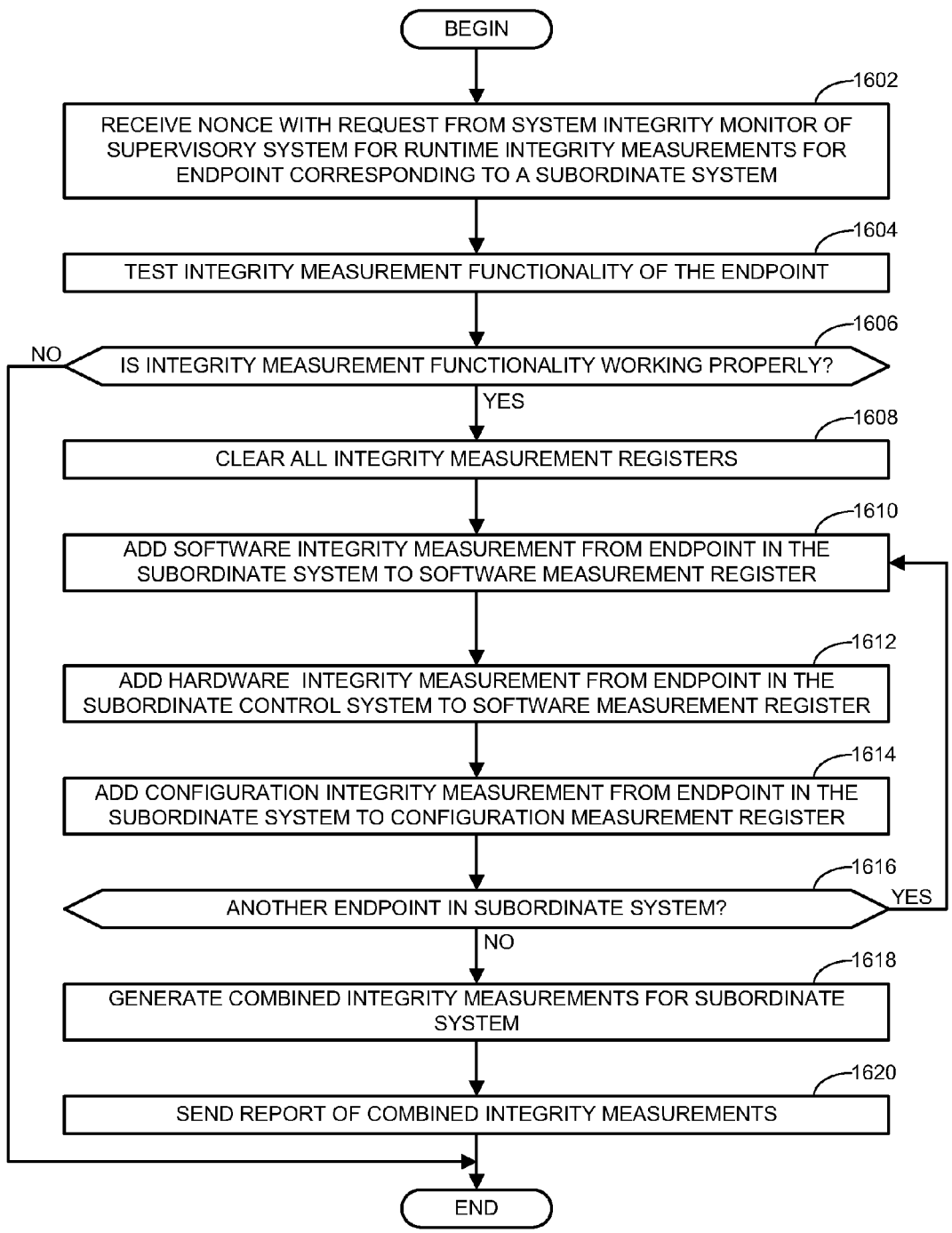

FIG. 16 is a flowchart representative of an example method to implement the example system integrity monitor (SIM) 228 of FIGS. 2, 3, and/or 6 to generate combined integrity measurements for an endpoint corresponding to a system of lower-level endpoints (e.g., the control system 200 as an endpoint in the supervisory system 300 of FIG. 3). That is, in the illustrated example of FIG. 16, the SIM 228 corresponds to a SIM implemented in a primary workstation of a control system (e.g., the primary workstation 220 of the control system 200) communicating with a primary workstation of a supervisory network (e.g., the primary workstation 306 of the supervisory system 300). Put another way, from the perspective of the primary workstation 306 of the supervisory system 300, the SIM 228 implemented in FIG. 6 functions to report integrity measurements in the same or similar manner as the IMMs 230 described above. However, as described more fully below, to generate such integrity measurements, the SIM 228 needs to first obtain or collect integrity measurements from IMMs 230 implemented in lower-level endpoints that the SIM 228 is monitoring.

The example method of FIG. 16 begins at block 1602 where the example communications interface 602 receives a nonce with a request from a system integrity monitor of a supervisory system for integrity measurements for an endpoint corresponding to a subordinate system (e.g., a control system within the supervisory system). In some examples, although the endpoint refers to an entire sub-system, the endpoint is effectively represented by a primary workstation in the sub-system implementing the SIM 228 receiving the request. In some examples, the nonce value provided with the request is to be used in generating the response. At block 1604, the example integrity measurement self-tester 504 tests the integrity measurement functionality of the SIM. At block 1606, the example integrity monitor controller 612 determines whether the integrity measurement functionality is working properly (e.g., the outputs are as expected). If not, the example method of FIG. 16 ends. In some examples, the integrity monitor controller 612 generates an error message indicating the test failed before the method ends. If the example integrity monitor controller 612 determines that the integrity measurement functionality is working properly (block 1606), control advances to block 1608.

At block 1608, the example integrity monitor controller 612 clears all of the integrity measurement registers 622, 624, 626. At block 1610, the example integrity monitor controller 612 adds the software integrity measurement from an endpoint in the subordinate system to the example software measurement register 622. In some examples, the software integrity measurement is obtained from the integrity measurement database 618 having been previously requested by the SIM 228 monitoring the corresponding endpoint. In other examples, the SIM 228 requests for the software integrity measurement in response to the request received at block 1602. At block 1612, the example integrity monitor controller 612 adds the hardware integrity measurement from the endpoint in the subordinate system to the example hardware measurement register 624. In some examples, the hardware integrity measurement is obtained from the integrity measurement database 618 having been previously requested by the SIM 228 monitoring the corresponding endpoint. In other examples, the SIM 228 requests for the hardware integrity measurement in response to the request received at block 1602. At block 1614, the example integrity monitor controller 612 adds the configuration integrity measurement from the endpoint in the subordinate system to the example configuration measurement register 626. In some examples, the configuration integrity measurement is obtained from the integrity measurement database 618 having been previously requested by the SIM 228 monitoring the corresponding endpoint. In other examples, the SIM 228 requests for the configuration integrity measurement in response to the request received at block 1602.

At block 1616, the example integrity monitor controller 612 determines whether there is another endpoint in the subordinate system. If so, control returns to blocks 1610, 1612, and 1614 to add the corresponding integrity measurements from the endpoint to the corresponding registers 622, 624, 626. In some examples, the integrity measurements are added to the respective registers by being appended to previously added integrity measurements. If the example integrity monitor controller 612 determines that there are no more endpoints in the subordinate system (block 1616), control advances to block 1618 where the example integrity measurement generator 608 generates a combined integrity measurements for the subordinate system. In some examples, the combined integrity measurements are generated by calculating a checksum of the string of values in each of the software, hardware, and configuration registers 622, 624, 626. At block 1620, the example communications interface 602 sends a report of the combined integrity measurements to the SIM of the supervisory system, at which point the example method of FIG. 16 ends.

Figure 17:
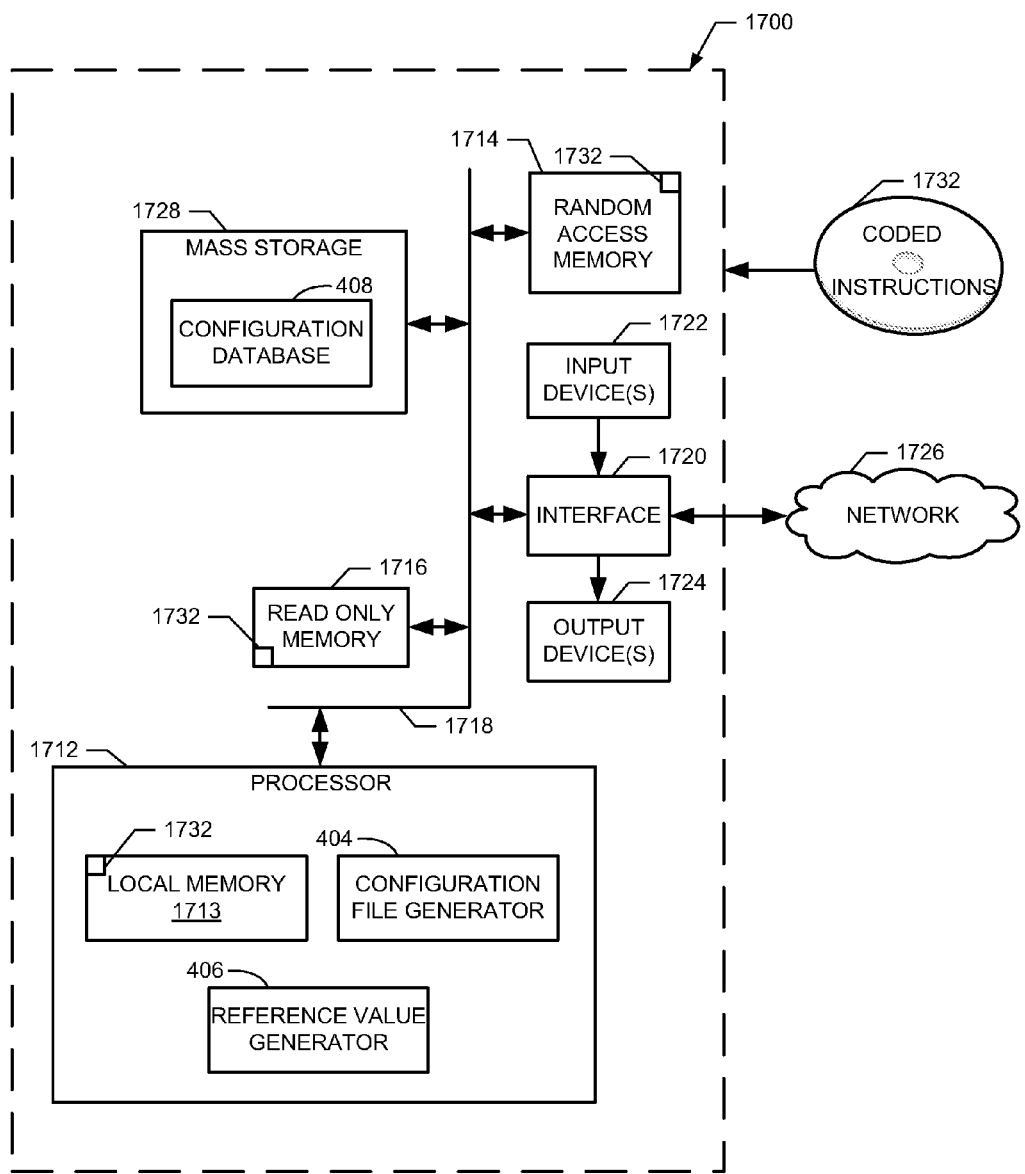
FIG. 17 is a schematic illustration of an example processor platform that may be used and/or programmed to carry out the example method of FIG. 7, and/or, more generally, to implement the example configuration module of FIGS. 2 and/or 4.

FIG. 17 is a block diagram of an example processor platform 1700 that may be used and/or programmed to carry out the example method of FIG. 7 to implement the example configuration module 226 of FIGS. 2 and/or 4. The processor platform 1700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). In the illustrated example, the processor 1712 implements the example configuration file generator 404 and/or the example reference value generator 406. The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. For example, the mass storage device 1728 may include the example configuration database 408 of FIG. 4. Examples of such mass storage devices 1728 include floppy disk drives, hard drive disks, compact disk drives, Blu-ray disk drives, RAID systems, and digital versatile disk (DVD) drives.

Coded instructions 1732 to implement the method of FIG. 7 may be stored in the mass storage device 1728, in the volatile memory 1714, in the non-volatile memory 1716, and/or on a removable tangible computer readable storage medium such as a CD or DVD.

Figure 18:
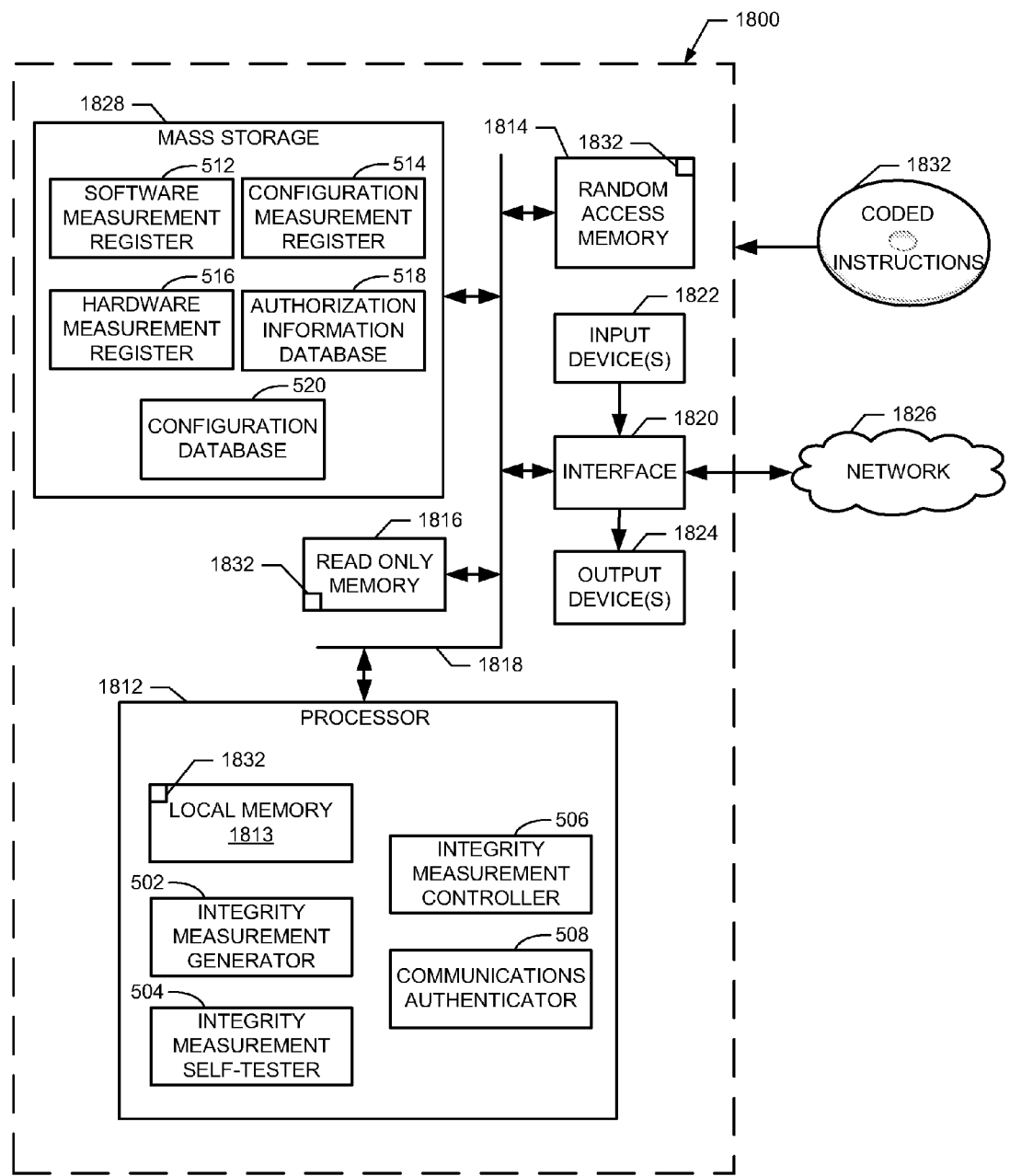
FIG. 18 is a schematic illustration of an example processor platform that may be used and/or programmed to carry out the example methods of FIGS. 8-10, and/or, more generally, to implement the example integrity measurement modules of FIGS. 2, 3, and/or 5.

FIG. 18 is a block diagram of an example processor platform 1800 that may be used and/or programmed to carry out the example methods of FIGS. 8-10 to implement the example integrity measurement module 230 of FIGS. 2, 3, and/or 5. The processor platform 1800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors or controllers from any desired family or manufacturer.

The processor 1812 of the illustrated example includes a local memory 1813 (e.g., a cache). In the illustrated example, the processor 1812 implements the example integrity measurement generator 502, the example integrity measurement self-tester 504, the example integrity measurement controller 506, and/or the example communications authenticator 508. The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device (s) 1822 permit(s) a user to enter data and commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1820 of the illustrated example, thus, typically includes a graphics driver card, a graphics driver chip or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.).

The processor platform 1800 of the illustrated example also includes one or more mass storage devices 1828 for storing software and/or data. For example, the mass storage device 1828 may include the example software measurement register 512, the example configuration measurement register 514, the example hardware measurement register 516, the example authorization information database 518, and/or the example configuration database 520 of FIG. 5. Examples of such mass storage devices 1828 include floppy disk drives, hard drive disks, compact disk drives, Blu-ray disk drives, RAID systems, and digital versatile disk (DVD) drives.

Coded instructions 1832 to implement the method of FIGS. 8-10 may be stored in the mass storage device 1828, in the volatile memory 1814, in the non-volatile memory 1816, and/or on a removable tangible computer readable storage medium such as a CD or DVD.

Figure 19:
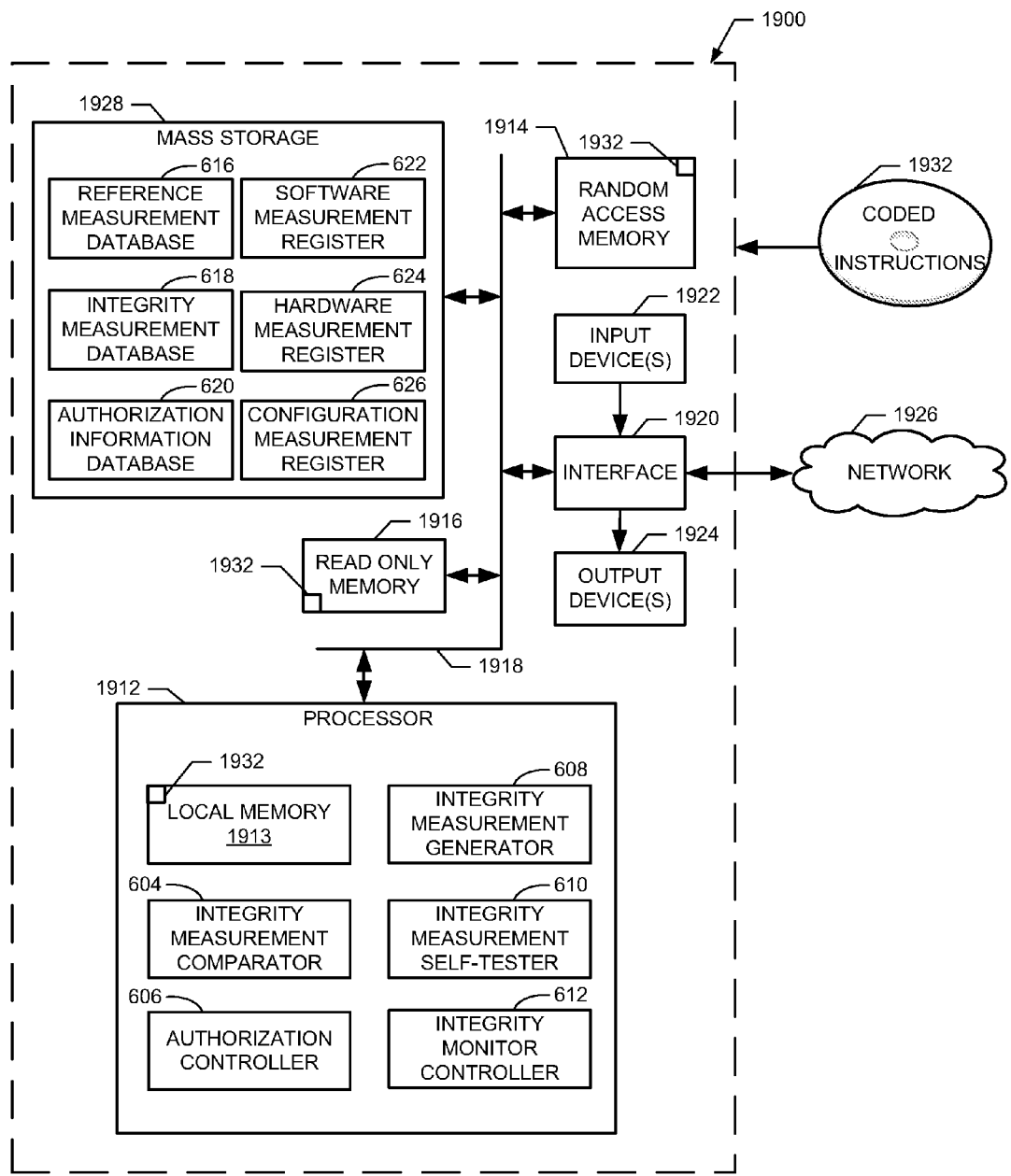
FIG. 19 is a schematic illustration of an example processor platform that may be used and/or programmed to carry out the example methods of FIGS. 11-16, and/or, more generally, to implement the example system integrity monitors of FIGS. 2, 3, and/or 6.

FIG. 19 is a block diagram of an example processor platform 1900 that may be used and/or programmed to carry out the example methods of FIGS. 11-16 to implement the example system integrity monitor 228 of FIGS. 2, 3, and/or 6. The processor platform 1900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer.

The processor 1912 of the illustrated example includes a local memory 1913 (e.g., a cache). In the illustrated example, the processor 1912 implements the example integrity measurement comparator 604, the example authorization controller 606, the example integrity measurement generator 608, the example integrity measurement self-tester 610, and/or the example integrity monitor controller 612. The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1920 of the illustrated example, thus, typically includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.).

The processor platform 1900 of the illustrated example also includes one or more mass storage devices 1928 for storing software and/or data. For example, the mass storage device 1928 may include the example reference value database 616, the example integrity measurement database 618, the example authorization information database 620, the example software measurement register 622, the example hardware measurement register 624, and/or the example configuration measurement register 626 of FIG. 6. Examples of such mass storage devices 1928 include floppy disk drives, hard drive disks, compact disk drives, Blu-ray disk drives, RAID systems, and digital versatile disk (DVD) drives.

Coded instructions 1932 to implement the method of FIGS. 11-16 may be stored in the mass storage device 1928, in the volatile memory 1914, in the non-volatile memory 1916, and/or on a removable tangible computer readable storage medium such as a CD or DVD.

From the foregoing, it will be appreciated that the above disclosed methods, apparatus and articles of manufacture improve the security and reliability of components within an industrial enterprise system. Unlike existing approaches that assume the integrity in network communicating devices (endpoints) based on quality assurances from original equipment manufacturers, the examples disclosed herein verify the integrity of such endpoints. Furthermore, such verification can be accomplished when an endpoint is initially being registered and/or admitted to a particular network and/or while the endpoint is in operation during runtime. In this manner, potential security breaches and/or other failures that compromise the integrity of the endpoints can be detected, regardless of when they occur, to ensure communications from such endpoints do not impact other endpoints and to enable remedial actions to be taken with respect to the compromised endpoint. Additionally, the teachings disclosed herein enable the roll-up and/or combination of integrity measurements for lower level endpoints for verification of a corresponding system subordinate to a higher level supervisory system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
an integrity measurement comparator to compare an integrity measurement to a reference value, the integrity measurement generated by a first endpoint in a first network of an industrial enterprise system associated with a process control system, the integrity measurement generated based on a current state of the first endpoint, the integrity measurement corresponding to a checksum associated with at least one of an operation, a security, or a reliability of the first endpoint, the reference value corresponding to a trusted state of the first endpoint, the first endpoint corresponding to a group of second endpoints in a subnetwork of the first network, the checksum corresponding to a combination of different integrity measurements corresponding to the group of second endpoints in the subnetwork; and
an authorization controller to enable communications access for the first endpoint on the first network based on the comparison of the integrity measurement to the reference value.

2. The apparatus of claim 1, further comprising an integrity measurement controller to update the reference value to correspond to the integrity measurement based on an approved override of a discrepancy between the integrity measurement and the reference value.

3. The apparatus of claim 1, wherein the communications access for the first endpoint corresponds to full communications access when the integrity measurement matches the reference value, the authorization controller to provide authorization information to the first endpoint to enable the full communications access.

4. The apparatus of claim 1, wherein the integrity measurement is generated by the first endpoint during boot-time of the first endpoint.

5. The apparatus of claim 1, wherein the integrity measurement is generated by the first endpoint during runtime of the first endpoint.

6. The apparatus of claim 1, wherein the authorization controller is to at least one of (1) generate an alarm when the integrity measurement fails to match the reference value, the alarm indicative of an integrity of the first endpoint that is suspect, or (2) flag data provided from the first endpoint when the integrity measurement fails to match the reference value, the flagged data indicative of an integrity of the first endpoint that is suspect.

7. The apparatus of claim 1, wherein the authorization controller prevents communications access for the first endpoint to the first network and enables communications access for a redundant endpoint when the integrity measurement fails to match the reference value.

8. The apparatus of claim 1, wherein the first network corresponds to a supervisory network of a supervisory system within the industrial enterprise system, the subnetwork corresponding to a control system subordinate to the supervisory system.

9. A method comprising:
receiving an integrity measurement from an endpoint in a network of an industrial enterprise system associated with a process control system, the integrity measurement generated by the endpoint based on a current state of the endpoint, the integrity measurement corresponding to a checksum associated with at least one of an operation, a security, or a reliability of the endpoint;
comparing the integrity measurement to a reference value corresponding to a trusted state of the endpoint;
enabling communications access for the endpoint to the network based on the comparison;
receiving approval to override a discrepancy between the integrity measurement and the reference value; and
updating the reference value to correspond to the integrity measurement based on the approval.

10. The method of claim 9, wherein the current state of the endpoint corresponds to at least one of software loaded on the endpoint, configuration data assigned to the endpoint, or a peripheral coupled to the endpoint.

11. The method of claim 10, wherein the checksum corresponds to the software loaded on the endpoint.

12. The method of claim 11, further comprising enabling firmware update communications access for the endpoint when the checksum fails to match the reference value.

13. The method of claim 10, wherein the checksum corresponds to the configuration data stored on the endpoint.

14. The method of claim 13, further comprising enabling configuration communications access when the checksum fails to match the reference value.

15. The method of claim 13, wherein the reference value is generated based on a configuration file generated for the network.

16. The method of claim 10, wherein the checksum corresponds to the peripheral coupled to the endpoint.

17. A non-transitory computer readable medium comprising instructions that, when executed, cause a machine to at least:
receive an integrity measurement from a first endpoint in a first network of an industrial enterprise system associated with a process control system, the integrity measurement generated by the first endpoint based on a current state of the first endpoint, the integrity measurement corresponding to a checksum associated with at least one of an operation, a security, or a reliability of the first endpoint, the first endpoint corresponding to a group of second endpoints in a subnetwork of the first network, the checksum corresponding to a combination of different integrity measurements corresponding to the group of second endpoints in the subnetwork;
compare the integrity measurement to a reference value corresponding to a trusted state of the first endpoint; and
enable communications access for the first endpoint to the first network based on the comparison.

18. A non-transitory computer readable medium of claim 17, wherein the instructions further cause the machine to enable full communications access for the first endpoint when the integrity measurement matches the reference value by providing authorization information to the first endpoint.

* * * * *